US009844827B2

(12) United States Patent
Tanaka et al.

(10) Patent No.: US 9,844,827 B2
(45) Date of Patent: Dec. 19, 2017

(54) CONTACT WELDING DETECTION SYSTEM

(71) Applicants: NIPPON SOKEN, INC., Nishio, Aichi-pref. (JP); DENSO CORPORATION, Kariya, Aichi-pref. (JP); ANDEN CO., LTD., Anjo, Aichi-pref. (JP)

(72) Inventors: Ken Tanaka, Aichi-ken (JP); Shinya Kato, Nagoya (JP); Masaya Itou, Toyota (JP); Hayato Mizoguchi, Kariya (JP)

(73) Assignees: NIPPON SOKEN, INC., Nishio (JP); DENSO CORPORATION, Kariya (JP); ANDEN CO., LTD., Anjo (JP)

( * ) Notice: Subject to any disclaimer, the term of this patent is extended or adjusted under 35 U.S.C. 154(b) by 502 days.

(21) Appl. No.: 14/469,911

(22) Filed: Aug. 27, 2014

(65) Prior Publication Data
US 2015/0060423 A1 Mar. 5, 2015

(30) Foreign Application Priority Data

Aug. 27, 2013 (JP) .................................. 2013-175878
Feb. 28, 2014 (JP) .................................. 2014-038856

(51) Int. Cl.
*B23K 9/095* (2006.01)
*B23K 9/067* (2006.01)
(Continued)

(52) U.S. Cl.
CPC ............ *B23K 9/095* (2013.01); *B23K 9/0671* (2013.01); *H02H 7/122* (2013.01); *H01H 71/501* (2013.01); *H02H 7/1213* (2013.01)

(58) Field of Classification Search
CPC .... B23K 9/0671; B23K 9/095; H02H 7/1213; H02H 7/122; H01H 71/501
(Continued)

(56) References Cited

U.S. PATENT DOCUMENTS

| 5,250,786 A | * | 10/1993 | Kikuchi | ............... B23K 9/1056 |
| | | | | 219/130.32 |
| 6,329,635 B1 | * | 12/2001 | Leong | .................. B23K 26/032 |
| | | | | 219/121.63 |

(Continued)

FOREIGN PATENT DOCUMENTS

| JP | 2012-152071 | 8/2012 |
| JP | 2015-035708 | 2/2015 |

*Primary Examiner* — Jeff Natalini
(74) *Attorney, Agent, or Firm* — Nixon & Vanderhye P.C.

(57) ABSTRACT

A contact welding detection system includes a main circuit including a DC power source, a power-supply unit electrically connected to the DC power source, and a main circuit relay electrically connected between the DC power source and the power-supply unit, a measurement unit measuring an electrical characteristic value on a signal wiring between a signal generation unit and the main circuit. The system further includes a welding determination unit configured to determine the presence or absence of contact welding in the relay on the basis of the electrical characteristic value, and a first forced ground-contacting unit electrically connected between the main circuit and a conductive member connected to ground. The first forced ground-contacting unit is electrically connected to the main circuit at a connection point located on an opposite side of the relay to a connection point at which the signal generation unit is electrically connected to the main circuit.

15 Claims, 32 Drawing Sheets

(51) Int. Cl.
*H02H 7/122* (2006.01)
*H01H 71/50* (2006.01)
*H02H 7/12* (2006.01)

(58) Field of Classification Search
USPC .............................. 219/130.01; 324/415–424
See application file for complete search history.

(56) References Cited

U.S. PATENT DOCUMENTS

| | | | | |
|---|---|---|---|---|
| 7,459,910 B2* | 12/2008 | Kawamura | .......... | H01H 47/002 |
| | | | | 307/39 |
| 8,653,823 B2* | 2/2014 | Gokhale | ................ | H02M 1/32 |
| | | | | 324/512 |
| 2009/0108674 A1* | 4/2009 | Ozaki | ................... | B60L 3/0046 |
| | | | | 307/10.6 |
| 2010/0194354 A1* | 8/2010 | Gotou | ..................... | B60L 3/003 |
| | | | | 320/163 |
| 2011/0248803 A1* | 10/2011 | Niimi | .................. | H01H 51/065 |
| | | | | 335/202 |
| 2014/0340090 A1* | 11/2014 | Lothamer | .......... | G01R 31/3278 |
| | | | | 324/418 |
| 2015/0146333 A1* | 5/2015 | Wu | ................... | G01R 31/3278 |
| | | | | 361/93.1 |

* cited by examiner

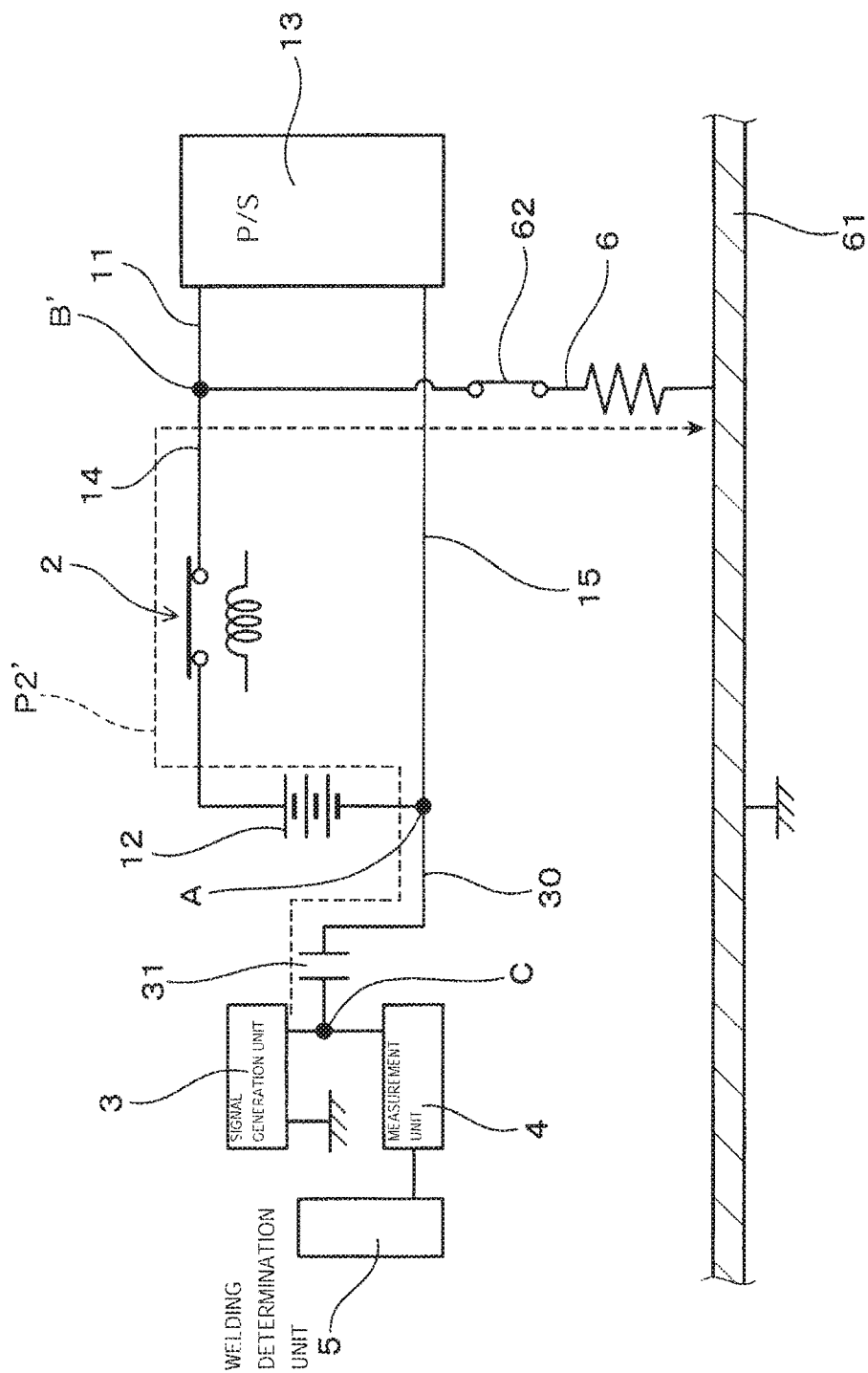

CONTACT WELDING DETECTION SYSTEM

CROSS-REFERENCE TO RELATED APPLICATION

This application is based on and claims the benefit of priority from earlier Japanese Patent Applications No. 2013-175878 filed Aug. 27, 2013 and No. 2014-38856 filed Feb. 28, 2014, the descriptions of which are incorporated herein by reference.

BACKGROUND (Technical Field)

The present invention relates to a contact welding detection system for detecting the presence or absence of welding of a pair of contacts in a relay provided along a current path between a direct current (DC) power source and a power-supply unit.

(Related Art)

A known component provided between a DC power source and a power-supply unit, such as a power converter, to connect and disconnect the DC power source to and from the power-supply unit may include a relay formed of an electromagnetic coil and a pair of contacts (hereinafter also referred to as a contact pair) to be opened or closed in response to whether or not the electromagnetic coil is in an energized state. Since Joule heat or arc heat or the like may be produced upon transitions of the electromagnetic coil between being energized or not, the pair of contacts in the relay tend to be hot and may possibly be welded to each other. Hence, several contact welding detection systems have been developed to detect such welding of the contact pair in the relay.

For example, a ground fault circuit interrupter disclosed in Japanese Patent Application Laid-Open Publication No. 2012-152071 includes two relays provided to connect and disconnect an alternating current (AC) power line at both ends of the AC power line, and is configured to individually control the two relays and determine whether or not a voltage detection unit detects an AC voltage when the two relays are controlled such that only one of the two relays is in a passing state. The ground fault circuit interrupter can thereby detect the presence or absence of welding of a pair of contacts in the other one of the two relays.

The ground fault circuit interrupter set forth above, however, has disadvantages that an unexpected current may flow through the power-supply unit when one of the two relays is placed in the passing state in the presence of welding of the pair of contacts in the other relay, and particularly, when the power-supply unit includes a capacitor or a coil or the like, an expected inrush current may flow through the power-supply unit.

Further, providing a separate circuit for detecting contact welding in the relays, as provided in the ground fault circuit interrupter set forth above, may increase the number of components.

In consideration of the foregoing, exemplary embodiments of the present invention are directed to providing a contact welding detection system for detecting the presence or absence of welding of a pair of contacts in a relay without controlling the relay in a passing state.

SUMMARY

In accordance with an exemplary embodiment of the present invention, there is provided a contact welding detection system including: a main circuit including a direct current (DC) power source, a power-supply unit electrically connected to the DC power source, and at least one main circuit relay electrically connected between the DC power source and the power-supply unit; a signal generation unit electrically connected to the main circuit and configured to generate an alternating current (AC) signal; and a measurement unit configured to measure an electrical characteristic value on a signal wiring between the signal generation unit and the main circuit.

The system further includes: a welding determination unit configured to determine presence or absence of contact welding in the at least one main circuit relay on the basis of the electrical characteristic value acquired from the measurement unit; and a first forced ground-contacting unit electrically connected between the main circuit and a conductive member connected to ground. The first forced ground-contacting unit includes a first welding testing switch for switching on and off a current flowing from the main circuit to the conductive member, and is electrically connected to the main circuit at a connection point that is located on an opposite side of the at least one main circuit relay to a connection point at which the signal generation unit is electrically connected to the main circuit.

As above, the contact welding detection system includes the signal generation unit electrically connected to the main circuit through the signal wiring, the measurement unit configured to measure the electrical characteristic value on the signal wiring, the main circuit relay, and the first forced ground-contacting unit electrically connected to the main circuit at the connection point located on an opposite side of the main circuit relay to the connection point at which the signal generation unit is electrically connected to the main circuit. The contact welding detection system is configured such that the main circuit and the conductive member are connected to each other by turning on and off the welding testing switch, and the electrical characteristic value acquired in the measurement unit may change in response to the presence or absence of contact welding in the main circuit relay while the main circuit and the conductive member are connected to each other.

In addition, in the contact welding detection system as above, the welding determination unit can determine the presence or absence of contact welding in the main circuit relay on the basis of the electrical characteristic value acquired in the measurement unit. As such, the contact welding detection system can determine the presence or absence of contact welding in the main circuit relay by switching on and off the first welding testing switch without controlling the main circuit relay in the (current) passing state.

The signal generation unit, the measurement unit and the welding determination unit can cooperatively serve as a leak detection system to test for the presence or absence of the electrical leakage from the main circuit. The signal generation unit, the measurement unit and the welding determination unit are components shared by the circuitry for detecting the presence or absence of contact welding in the main circuit relay and the circuitry for detecting the presence or absence of electrical leakage from the main circuit. This can lead to reduction in total number of components of the system.

The contact welding detection system configured as above is capable of detecting the presence or absence of contact welding in the main circuit relay without controlling the main circuit relay in the passing state.

BRIEF DESCRIPTION OF THE DRAWINGS

FIG. 6B is a schematic circuit diagram showing a current path of an AC signal in the presence of contact welding in a main circuit relay in accordance with the second embodiment;

DESCRIPTION OF THE PREFERRED EMBODIMENTS (Embodiments)

The present invention will be described more fully hereinafter with reference to the accompanying drawings. Like numbers refer to like elements throughout.

(First Embodiment)

Figure 1:
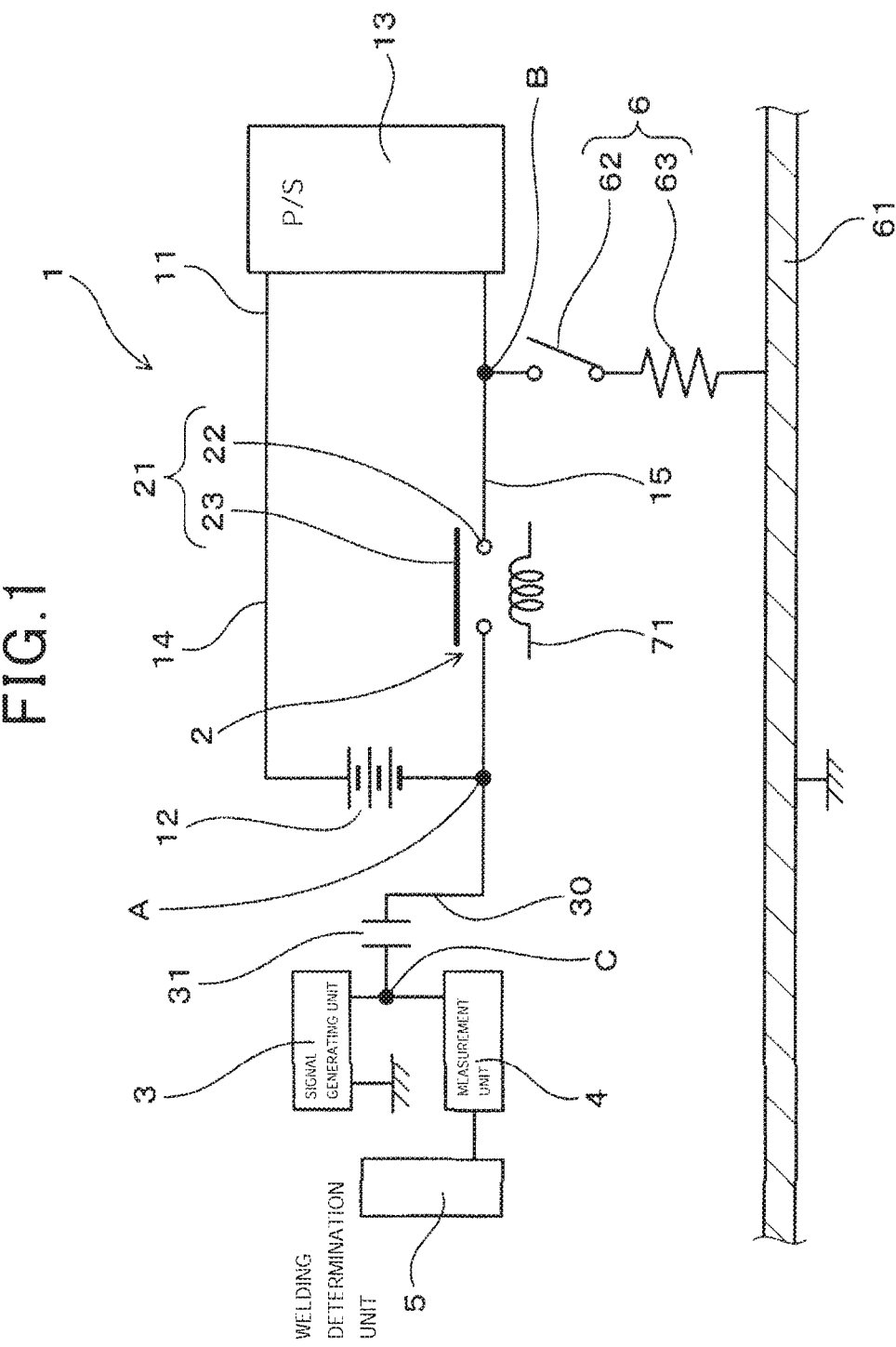
FIG. 1 is a schematic circuit diagram of a contact welding detection system in accordance with a first embodiment of the present invention.

There will now be explained a contact welding detection system in accordance with a first embodiment of the present intention with reference to FIGS. 1-5. As shown in FIG. 1, the contact welding detection system 1 includes a main circuit 11, a signal generation unit 3, a measurement unit 4, a welding determination unit 5, and a first forced ground-contacting unit 6. The main circuit 11 includes a direct current (DC) power source 12, a power-supply unit 13 electrically connected to the DC power source 12, and a main circuit relay 2 electrically connected between the DC power source 12 and the power-supply unit 13.

Figure 3:
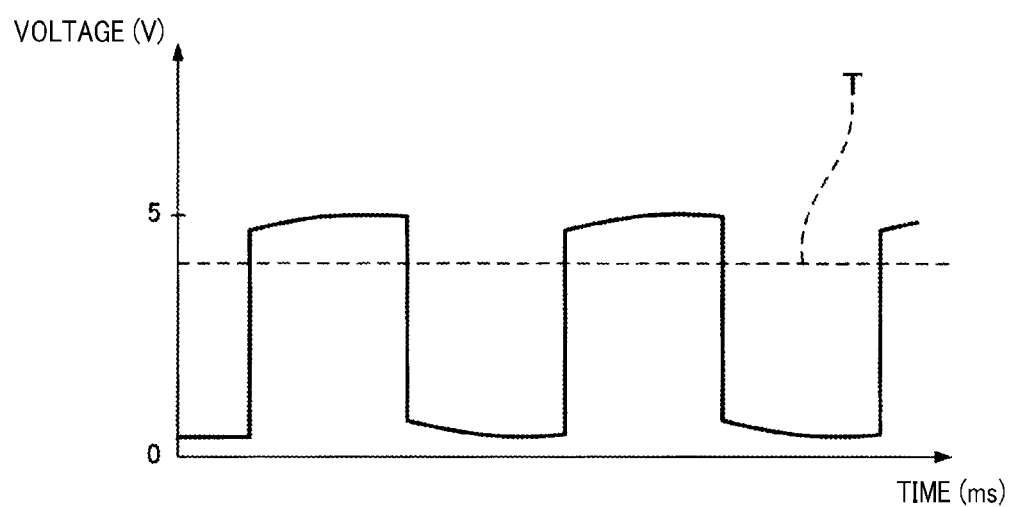
FIG. 3 shows a graph of a waveform of an AC signal acquired from a measurement unit in the absence of contact welding in the main circuit relay in accordance with the first embodiment.
Figure 5:
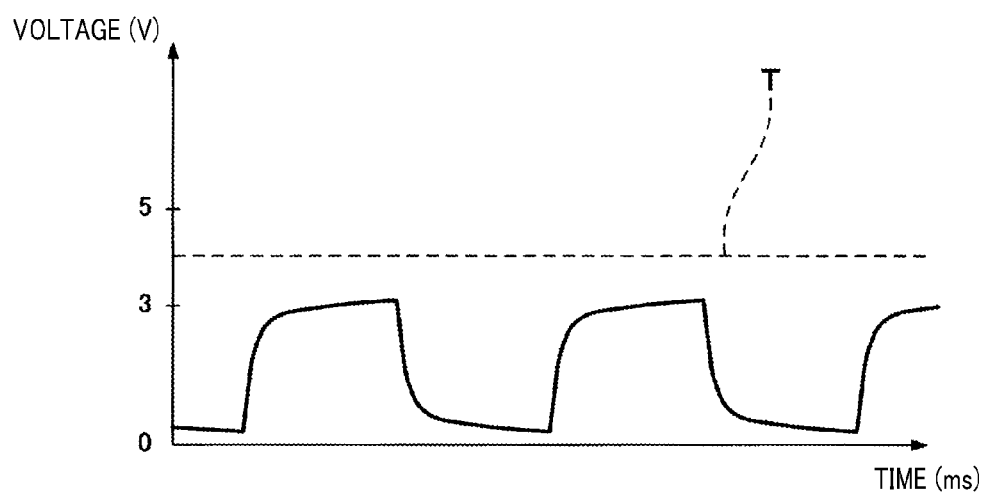
FIG. 5 shows a graph of a waveform of the AC signal acquired from the measurement unit in the presence of contact welding in the main circuit relay in accordance with the first embodiment.

The signal generation unit 3 is electrically connected to the main circuit 11 and configured to generate an alternate current (AC) signal (see FIGS. 3 and 5). The measurement unit 4 is configured to measure an electrical characteristic value on a signal wiring 30 between the signal generation unit 3 and the main circuit 11. The welding determination unit 5 is configured to determine the presence or absence of welding of a contact pair in the main circuit relay 2 on the basis of the electrical characteristic value acquired from the measurement unit 4.

The first forced ground-contacting unit 6 is provided between the conductive member 61 (e.g., a vehicle-body ground) and the main circuit 11 and electrically connected to the main circuit 11 at a connection point B that is located on an opposite side of the main circuit relay 2 to a connection point A at which the signal generation unit 3 is electrically connected to the main circuit 11. The first forced ground-contacting unit 6 includes a first welding testing switch 62 for switching on and off a current flowing from the main circuit 11 to the conductive member 61.

Examples of the first welding testing switch 62 may include, but are not limited to, a relay, and a semiconductor switch, such as a metal-oxide semiconductor field-effect transistor (MOSFET) or an insulated gate bipolar transistor (IGBT) or the like. Use of the semiconductor switch may reduce power required to control the first welding testing switch 62 as compared to the relay. In addition, the semiconductor switch has a less operational time as compared to the relay, which may reduce a time period required to detect the presence or absence of contact welding.

In the main circuit 11, as shown in FIG. 1, a positive terminal of the DC power source 12 and the power-supply unit 13 are electrically connected to each other through a positive wiring 14, and a negative terminal of the DC power source 12 and the power-supply unit 13 are electrically connected to each other through a negative wiring 15. In the present embodiment, the power-supply unit 13 includes semiconductor switches (not shown) for switching on and off the current within the power-supply unit 13 to form a power converter, such as a DC-DC converter or an inverter.

The main circuit relay 2 is provided in the negative wiring 15. The main circuit relay 2 includes a stationary contact part 22 and a movable contact part 23 and is configured such that the movable contact part 23 is movable into and out of contact with the stationary contact part 22 by a magnetomotive force of an electromagnetic coil 71.

The signal generation unit 3 is electrically connected to a connection point A along the negative wiring 15 between the DC power source 12 and the main circuit relay 2 through the signal wiring 30. A capacitor 31 is provided in the signal wiring 30 to isolate the signal generation unit 3 from the direct-current (DC) voltage of the DC power source 12. In the present embodiment, the signal generation unit 3 is configured to generate a square wave having an amplitude of 5V. In some other embodiments, the signal generation unit 3 may be configured to generate a sine wave, a triangular wave or the like as a continuous wave, or a mono-pulse wave.

The measurement unit 4 is electrically connected to a connection point C along the signal wiring 30 between the signal generation unit 3 and the capacitor 31. As with the signal generation unit 3, this allows the measurement unit 4 to be isolated from the direct current of the DC power source 12.

In the present embodiment, the measurement unit 4 is configured to measure a voltage value at the connection point C as an electrical characteristic value. The voltage value measured at the connection point C will be equivalent to a voltage value measured at the connection point A.

The welding determination unit 5 is electrically connected to the measurement unit 4 to receive an alternating current (AC) signal measured by the measurement unit 4. The welding determination unit 5 is configured to determine the presence or absence of welding of the contact pair 21 in the main circuit relay 2 on the basis of a voltage value of the received AC signal.

The first forced ground-contacting unit 6 electrically connects the main circuit 11 and the conductive member 61 via the first welding testing switch 62. The connection point B between the first forced ground-contacting unit 6 and the main circuit 11 is positioned along the negative wiring 15 between the main circuit relay 2 and the power-supply unit 13.

In addition, the first forced ground-contacting unit 6 includes a resistor 63 electrically connected in series with the first welding testing switch 62. In the present embodiment, the first welding testing switch 62 and the resistor 63 are arranged in this order along a direction from the main circuit 11 to the resistor 63. Alternatively, the resistor 63 and the first welding testing switch 62 may be arranged in this order along the same direction.

There will now be explained the operations of the contact welding detection system 1. Testing for the presence of welding of the contact pair 21 in the main circuit relay 2 is conducted by controlling energization of the electromagnetic coil 71 so that the movable contact part 23 moves out of contact with the stationary contact part 22 and controlling the semiconductor switches in the power-supply unit 13 to be off so that no current flows through the power-supply unit 13, and then placing the first welding testing switch 62 in a passing state.

Figure 2:
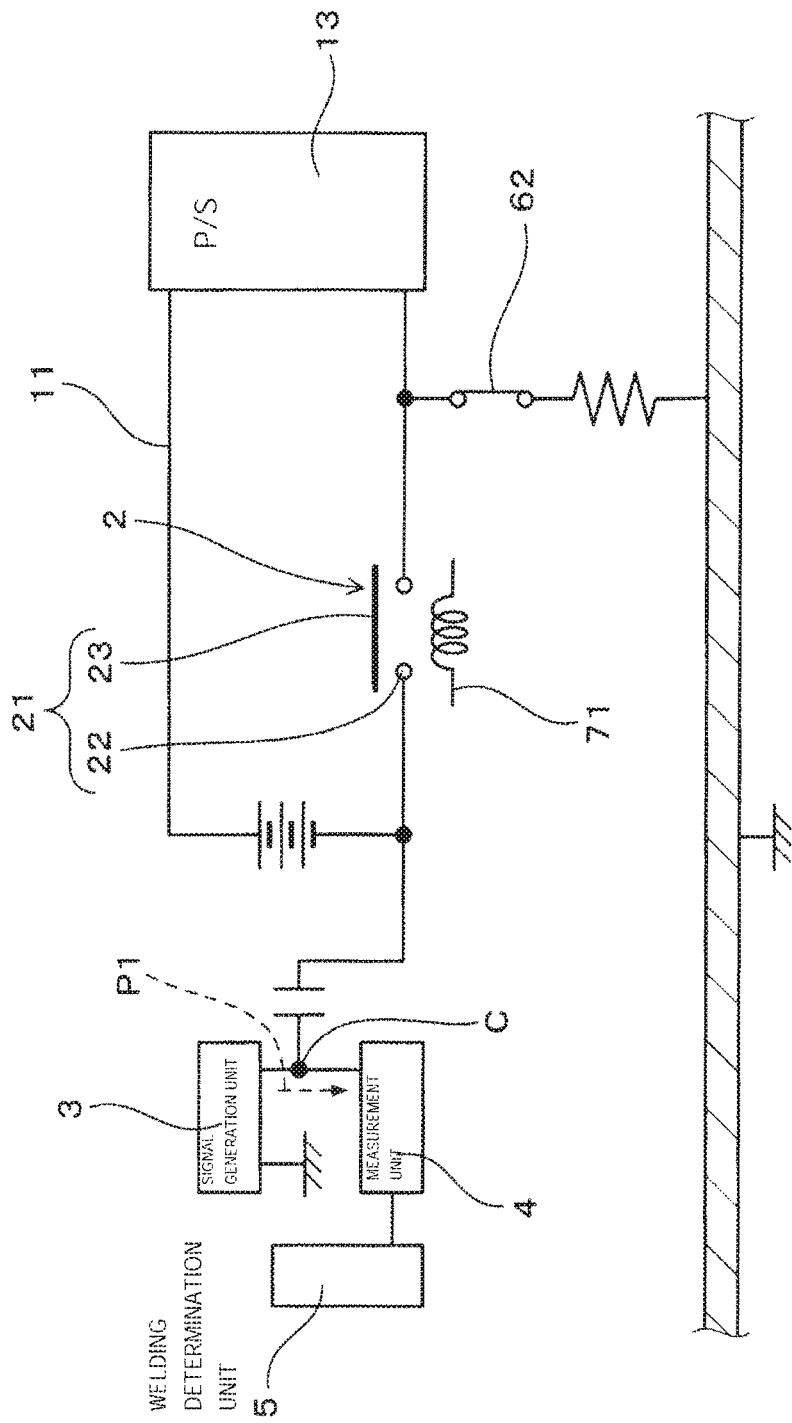
FIG. 2 is a schematic circuit diagram showing a current path of an AC signal in the absence of contact welding in a main circuit relay in accordance with the first embodiment.

In the absence of welding of the contact pair 21 in the main circuit relay 2, the main circuit relay 2 will be in a (current) blocking state in which the stationary contact part 22 and the movable contact part 23 are out of contact with each other. Hence, the AC signal generated in the signal generation unit 3 will not pass through the main circuit 11, but will pass to the measurement unit 4 through a connection point C along a current path P1 as shown in FIG. 2. Further, as shown in FIG. 3, the voltage value measured in the measurement unit 4 will become comparable to an amplitude of the AC signal as generated in the signal generation unit 3.

Figure 4:
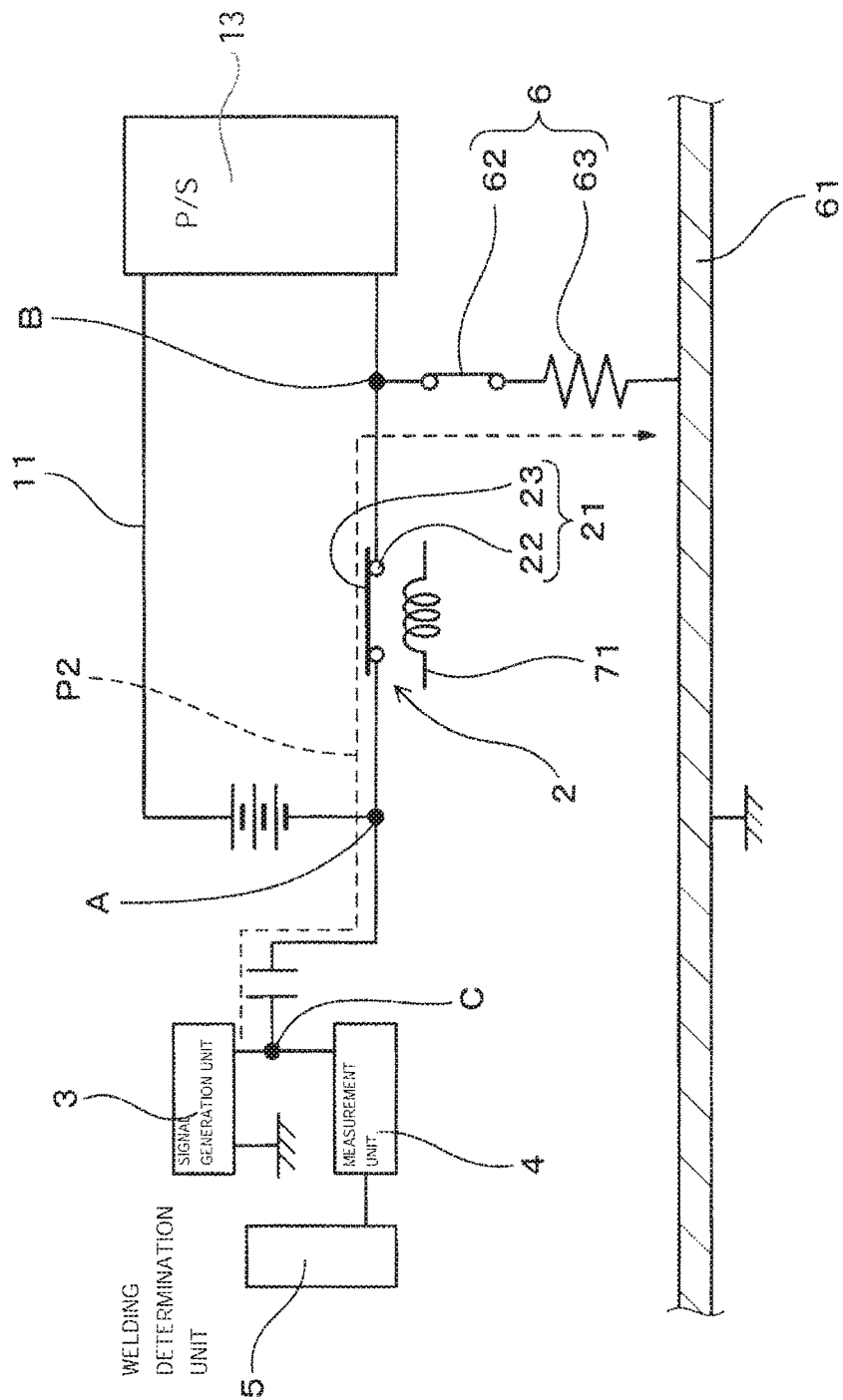
FIG. 4 is a schematic circuit diagram showing a current path of the AC signal in the presence of contact welding in the main circuit relay in accordance with the first embodiment.

In the presence of welding of the contact pair 21 in the main circuit relay 2, the main circuit relay 2 will be left in a passing state even after controlling energization of the electromagnetic coil 71 so that the movable contact part 23 moves out of contact with the stationary contact part 22, in which state the stationary contact part 22 and the movable contact part 23 are in contact with each other. The AC signal generated in the signal generation unit 3 will then pass to the conductive member 61 through the connection point C, the connection point A, the main circuit relay 2, the connection point B, and the first forced ground-contacting unit 6 in this order along a current path P2 as shown in FIG. 4. The voltage value measured in the measurement unit 4 will become less than an amplitude of the AC signal as generated in the signal generation unit 3. For example, in the present embodiment, as shown in FIG. 5, the voltage value measured in the measurement unit 4 becomes about 3V due to a voltage drop across the resistor 63.

As above, the contact welding detection system 1 is configured such that the voltage value measured in the measurement unit 4 (hereinafter also referred to as the measured voltage value) changes in response to the presence or absence of welding of the contact pair 21 in the main circuit relay 2. The welding determination unit 5 compares the measured voltage value with a predetermined threshold T (see FIGS. 3 and 5). When the measured voltage value is equal to or greater than the predetermined threshold T (see FIG. 3), then the welding determination unit 5 determines that the pair of the stationary contact part 22 and the movable contact part 23 are not welded to each other. When the measured voltage value is less than the predetermined threshold T (see FIG. 5), then the welding determination unit 5 determines that the pair of the stationary contact part 22 and the movable contact part 23 are welded to each other.

In addition, the contact welding detection system 1 can serve as a leak detection system for detecting the presence or absence of the electrical leakage from the main circuit 11 by generating the AC signal while keeping the welding testing switch 62 in the blocking state. In the presence of the electrical leakage from the main circuit 11, the impedance of the main circuit 11 will be lowered as compared to in the absence of the electrical leakage from the main circuit 11. Accordingly, in the presence of the electrical leakage from the main circuit 11, the voltage value of the AC signal measured in the measurement unit 4 decreases as compared to in the absence of the electrical leakage. As such, in the contact welding detection system 1 configured as above, the welding determination unit 5 may determine not only the presence or absence of welding of the contact pair 21, but also the presence or absence of the electrical leakage from the main circuit 11.

There will now be explained advantages of the present embodiment. The contact welding detection system 1 includes the signal generation unit 3 electrically connected to the main circuit 11 through the signal wiring 30, the measurement unit 4 configured to measure the electrical characteristic value (voltage value) on the signal wiring 30, the main circuit relay 2, and the first forced ground-contacting unit 6 electrically connected to the main circuit 11 at the connection point B that is located on an opposite side of the main circuit relay 2 to the connection point A. The welding determination unit 5 can determine the presence or absence of welding of the contact pair 21 on the basis of the electrical characteristic value acquired by the measurement unit 4. As such, the contact welding detection system 1 can determine the presence or absence of welding of the contact pair 21 in the main circuit relay 2 by switching on and off the first welding testing switch 62 without controlling the main circuit relay 2 to be in the passing state.

In addition, the signal generation unit 3, the measurement unit 4 and the welding determination unit 5 can cooperatively serve as the leak detection system to test for the presence or absence of the electrical leakage from the main circuit 11. That is, the signal generation unit 3, the measurement unit 4 and the welding determination unit 5 are components shared by the circuitry for detecting the presence or absence of welding of the contact pair 21 and the circuitry for detecting the presence or absence of electrical leakage from the main circuit 11. This can lead to reduction in total number of components of the system 1.

The first forced ground-contacting unit 6 includes a series connection of the first welding testing switch 62 and the resistor 63, which can reduce a power consumption required to detect the presence or absence of welding of the contact pair in the main circuit relay 2.

As above, the contact welding detection system 1 is capable of detecting the presence or absence of welding of the contact pair in the main circuit relay 2 without controlling the relay 2 to be in the passing state.

Alternatively, in the present embodiment, the connection point A between the main circuit 11 and the signal generation unit 3 may be provided along the positive wiring 14. Additionally or alternatively, the position of the connection point A between the main circuit 11 and the signal generation unit 3 and the position of the connection point B between the first forced ground-contacting unit 6 and the main circuit 11 may be exchanged.

(Second Embodiment)

Figure 6A:
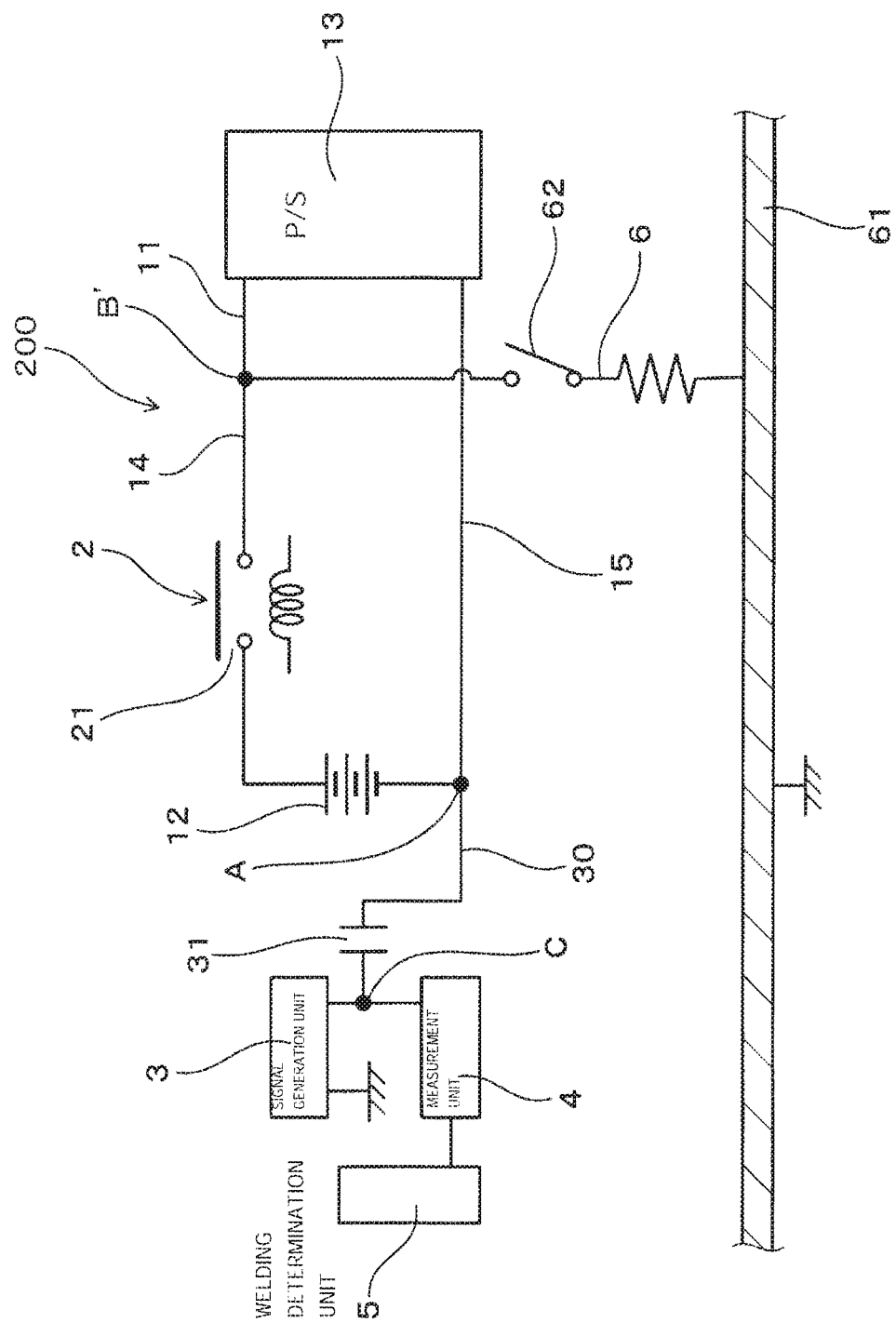
FIG. 6A shows a schematic circuit diagram of a contact welding detection system in accordance with a second embodiment of the present invention.

FIG. 6A shows a contact welding detection system 200 in accordance with a second embodiment of the present invention, which is similar in configuration to the contact welding detection system 1 of the first embodiment except that the main circuit relay 2 is provided in the positive wiring 14 and the first forced ground-contacting unit 6 is electrically connected to the positive wiring 14. More specifically, the first forced ground-contacting unit 6 is electrically connected to the main circuit 11 at a connection point B' located along the positive wiring 14 and between the main circuit relay 2 and the power-supply unit 13, and the signal generation unit 3 is electrically connected to the main circuit 11 at the connection point A located along the negative wiring 15. In FIGS. 6A and 6B, elements having similar functions as in the first embodiment are assigned the same numbers, except where specified otherwise.

In the presence of welding of the contact pair 21 in the main circuit relay 2, the AC signal generated in the signal generation unit 3 will pass to the conductive member 61 through the connection point C, the connection point A, the DC power source 12, the main circuit relay 2, the connection point B' and the first forced ground-contacting unit 6 in this order along a current path P2' as shown in FIG. 6B. Therefore, as in the first embodiment, the voltage value measured in the measurement unit 4 will change in response to the presence or absence of welding of the contact pair 21 in the main circuit relay 2. This allows the welding determination unit 5 to determine the presence or absence of welding of the contact pair 21 in the main circuit relay 2 on the basis of the measured voltage value. The same advantages as those indicated above for the first embodiment also apply to the second embodiment.

Alternatively, in the present embodiment, the connection point A between the main circuit 11 and the signal generation unit 3 may be provided along the positive wiring 14 and between the DC power source 12 and the main circuit relay 2. Additionally or alternatively, the position of the connection point A between the main circuit 11 and the signal generation unit 3 and the position of the connection point B' between the first forced ground-contacting unit 6 and the main circuit 11 may be exchanged.

(Third Embodiment)

Figure 7:
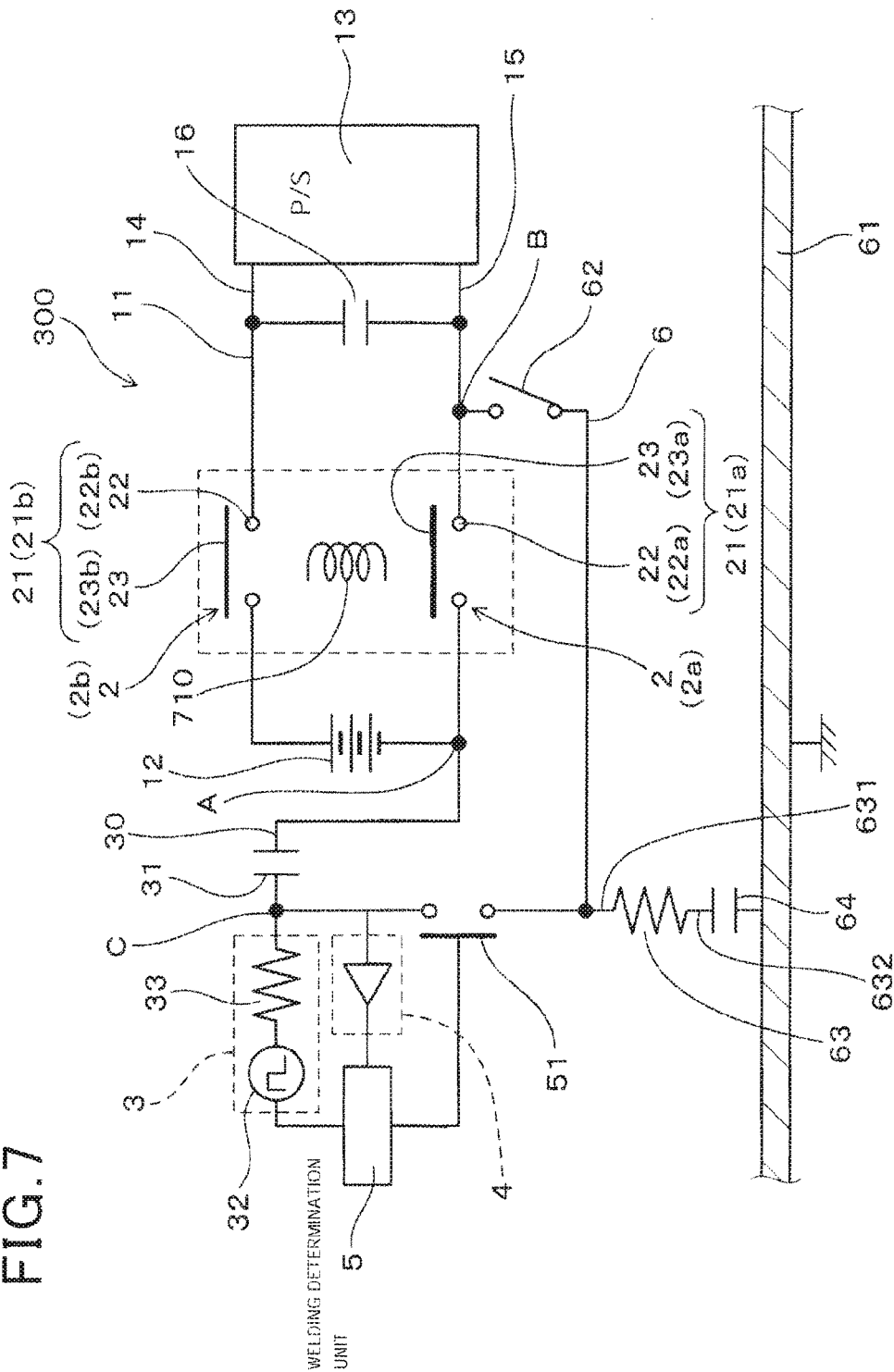
FIG. 7 shows a schematic circuit diagram of a contact welding detection system in accordance with a third embodiment of the present invention.

There will now be explained a contact welding detection system 300 in accordance with a third embodiment of the present invention with reference to FIGS. 7-10. The contact welding detection system 300 includes two main circuit relays 2: a positive relay 2b provided in the positive wiring 14 and a negative relay 2a provided in the negative wiring 15. As shown in FIG. 7, the contact welding detection system 300 of the third embodiment is configured such that a movable contact part 23b of the positive relay 2b and a movable contact part 23a of the negative relay 2a are movable into and out of contact with their respective stationary contact parts 22b and 22a by a magneto-motive force of an electromagnetic coil 710 shared by the positive relay 2b and the negative relay 2a. The negative stationary contact part 22a and the negative movable contact part 23a forms a negative contact pair 21a of the negative relay 2a, and the positive stationary contact part 22b and the positive movable contact part 23b forms a positive contact pair 21b of the positive relay 2b.

The signal generation unit 3 is electrically connected to the main circuit 11 at the connection point A that is located between the DC power source 12 and the negative relay 2a through the signal wiring 30. The first forced ground-contacting unit 6 is electrically connected to the main circuit 11 at the connection point B that is located between the negative relay 2a and the power-supply unit 13.

In the present embodiment, the signal generation unit 3 includes a series connection of a signal source 32 that generates a square wave and a resistor 33. The resistor 33 is directly connected to the capacitor 31 provided in the signal wiring 30.

Figure 8:
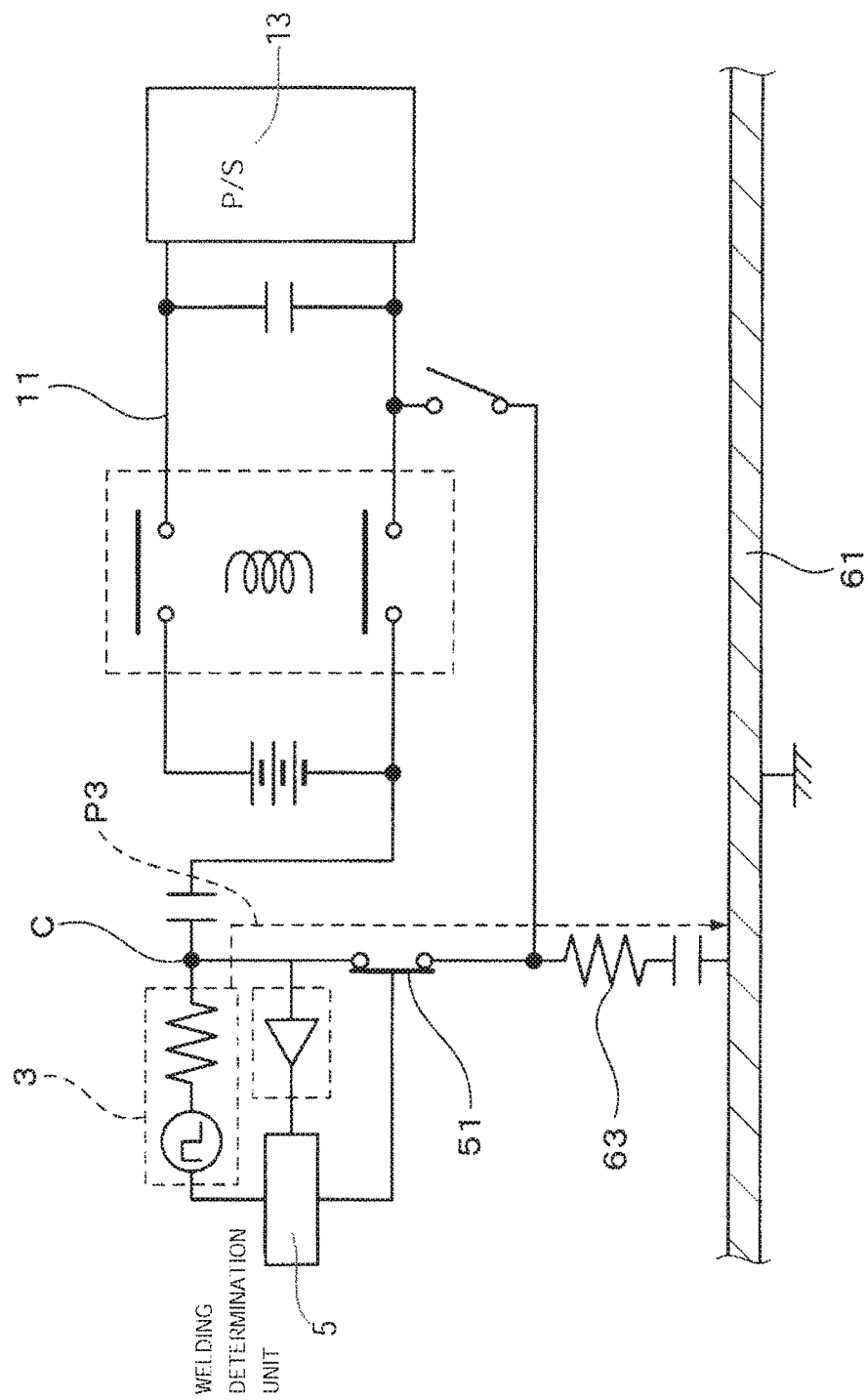
FIG. 8 is a schematic circuit diagram showing a current path of an AC signal with an operation verification switch in a passing state in accordance with the third embodiment.

In the present embodiment, the first forced ground-contacting unit 6 includes the first welding testing switch 62, the resistor 63, and a capacitor 64. One terminal 631 of the resistor 63 is electrically connected not only to the first welding testing switch 62, but also to the signal wiring 30 at the connection point C that is located between the signal generation unit 3 and the measurement unit 4 through the operation verification switch 51, so that, as shown in FIG. 8, when the operation verification switch 51 is in a passing state, the AC signal generated in the signal generation unit 3 can pass to the resistor 63 along a current path P3 without passing through the main circuit 11. The other terminal 632 of the resistor 63 is electrically connected to the conductive member 61 through the capacitor 64, which allows the conductive member 61 to be electrically isolated from the main circuit 11.

The operation verification switch 51 is electrically connected to the welding determination unit 5 to provide to the welding determination unit 5 information about whether the operation verification switch 51 is in the passing state or in the blocking state.

The contact welding detection system 1 includes a capacitor 16. One terminal of the capacitor 16 is electrically connected to the positive wiring 14 between the positive relay 2b and the power-supply unit 13, and another terminal of the capacitor 16 is electrically connected to the negative wiring 15 between the negative relay 2a and the power-supply unit 13, more specifically, between the connection point B for the first forced ground-contacting unit 6 and the power supply unit 13. Alternatively, the other terminal of the capacitor 16 may be electrically connected to the negative wiring 15 between the negative relay 2a and the connection point B for the first forced ground-contacting unit 6.

There will now be explained the operations of the contact welding detection system 300. Testing for the presence or absence of welding of the respective contact pairs 21 (21a and 21b) in the main circuit relays 2 (the negative relay 2a and the positive relay 2b) is conducted by controlling the energization of the shared electromagnetic coil 710 so that the movable contact part 23a moves out of contact with the stationary contact part 22a and the movable contact part 23b moves out of contact with the stationary contact part 22b in the positive relay 2b, and then placing the first welding testing switch 62 in the passing state.

In the absence of welding of the positive contact pair 21b and welding of the negative contact pair 21a, the positive relay 2b and the negative relay 2a are both placed in the blocking state, where the stationary contact part 22b and the movable contact part 23b of the positive relay 2b are out of contact with each other and the stationary contact part 22a and the movable contact part 23a of the negative relay 2a are out of contact with each other. Hence, as in the first embodiment, the AC signal generated in the signal generation unit 3 will not pass through the main circuit 11, and the voltage value measured in the measurement unit 4 will therefore become comparable to an amplitude of the AC signal as generated in the signal generation unit 3.

Figure 9:
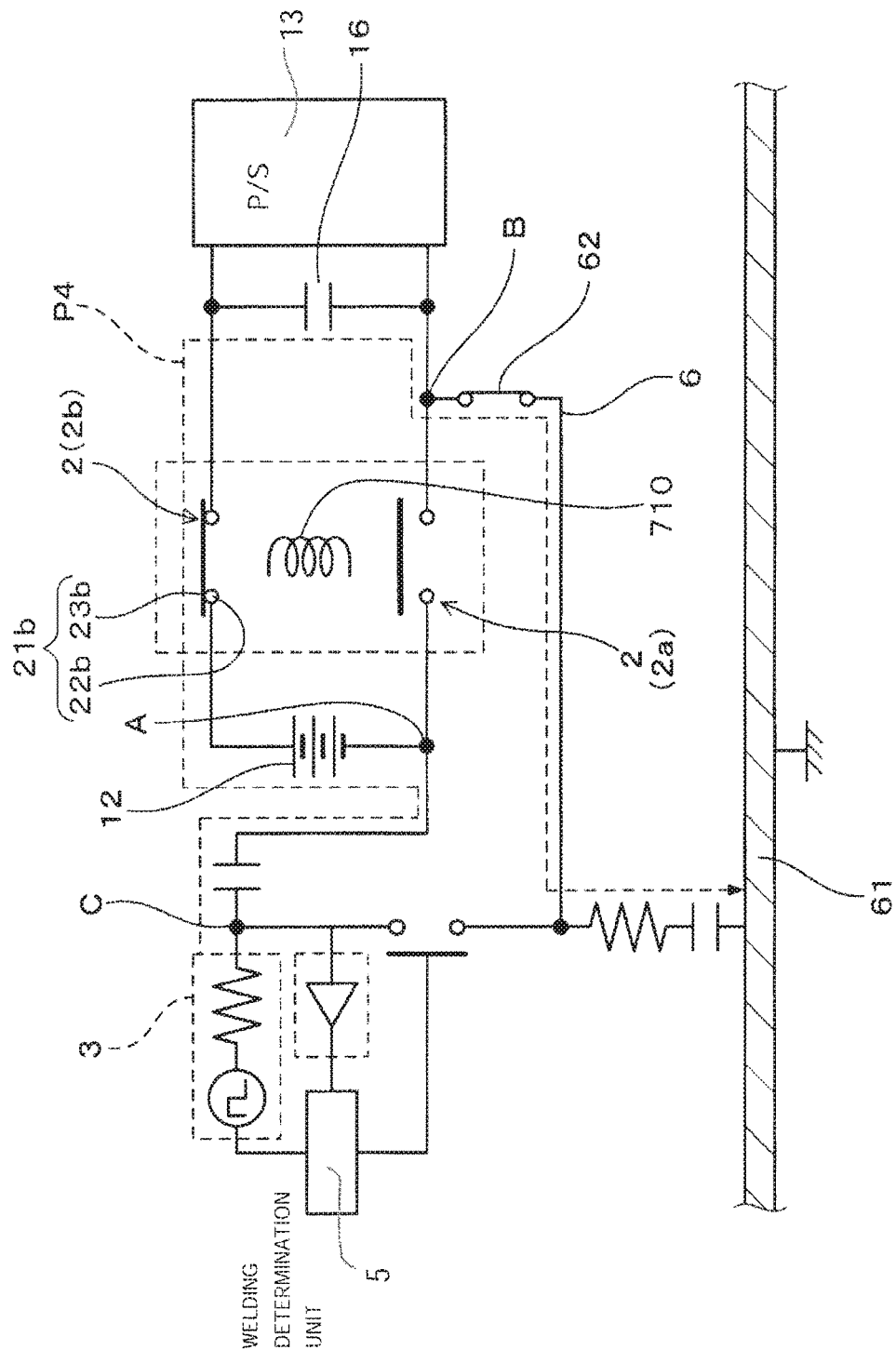
FIG. 9 is a schematic circuit diagram showing a current path of the AC signal in the presence of contact welding in a positive relay in accordance with the third embodiment.
Figure 10:
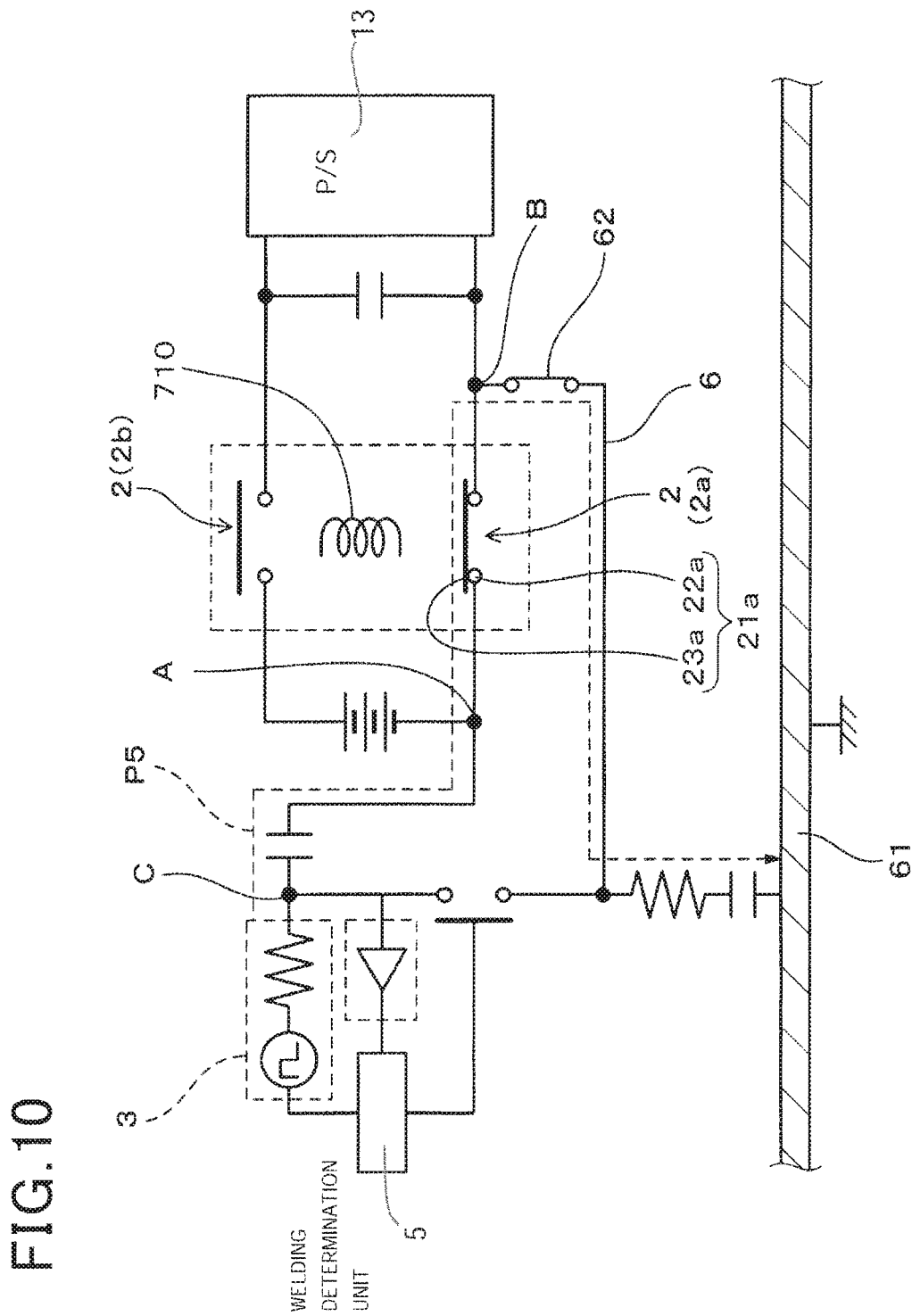
FIG. 10 is a schematic circuit diagram showing a current path of the AC signal in the presence of contact welding in a negative relay in accordance with the third embodiment.

In the presence of either or both of welding of the positive contact pair 21b and welding of the negative contact pair 21a, either or both of the positive relay 2b and the negative relay 2a will be left in the passing state even after controlling the energization of the shared electromagnetic coil 710 so that the stationary contact part 22b and the movable contact part 23b of the positive relay 2b are placed out of contact with each other and the stationary contact part 22a and the movable contact part 23a of the negative relay 2a are placed out of contact with each other. For example, in the presence of welding of the positive contact pair 21b only, the AC signal generated in the signal generation unit 3 will pass to the conductive member 61 through the connection point C, the connection point A, the DC power source 12, the positive relay 2b, the capacitor 16, the connection point B, and the first forced ground-contacting unit 6 in this order along a current path P4 as shown in FIG. 9. In the presence of welding of the negative contact pair 21a only, the AC signal generated in the signal generation unit 3 will pass to the conductive member 61 through the connection point C, the connection point A, the negative relay 2a, the connection point B, and the first forced ground-contacting unit 6 in this order along a current path P5 as shown in FIG. 10. Hence, in either one of the cases set forth above, the voltage value measured in the measurement unit 4 will become less than an amplitude of the AC signal as generated in the signal generation unit 3.

In the present embodiment, the contact welding detection system 300 is configured to verify the operation of the contact welding detection system 300 by placing the operation verification switch 51 in the passing state. That is, as shown in FIG. 8, the signal generation unit 3 and the resistor 63 are short-circuited by switching the operation verification switch 51 from the blocking state to the passing state, which allows the AC signal generated in the signal generation unit 3 to pass to the conductive member 61 through the connection point C, the operation verification switch 51, the resistor 63 in this order along a current path P3. The voltage value measured in the measurement unit 4 will become almost equal to the voltage value as measured in the presence of either or both of welding of the positive contact pair 21b and welding of the negative contact pair 21a. Hence, whether or not the welding determination unit 5 is operating correctly can be verified by comparing information about whether the operation verification switch 51 is in the passing state or in the blocking state with the determination of the presence or absence of contact-pair welding made in the welding determination unit 5. This can enhance reliability of the contact welding detection system.

The contact welding detection system 300 of the present embodiment is similar in configuration to the contact welding detection system 1 of the first embodiment, except that the contact welding detection system 300 can further function as a leak detection system for determining locations where electrical leakages are occurring. The contact welding detection system 300 functions as the leak detection system as follows. First, the AC signal is produced in the signal generation unit 3 with both the positive relay 2b and the negative relay 2a kept in the blocking state. In the absence of welding of the positive contact pair 21b and welding of the negative contact pair 21a, the AC signal produced in the signal generation unit 3 cannot reach the power-supply unit 13 side portion of the main circuit 11 relative to the negative and positive relays 2a and 2b, which allows the contact welding detection system 300 to determine the presence or absence of electrical leakage in the DC power source 12 side portion of the main circuit 11 relative to the negative and positive relays 2a and 2b.

Subsequently, the AC signal is produced in the signal generation unit 3 with the negative and positive relays 2a and 2b both kept in the passing state and the power-supply unit 13 kept in a current non-flow state, which allows the contact welding detection system 300 to determine the presence or absence of electrical leakage along at least one of the positive wiring 14 and the negative wiring 15. Thereafter, the AC signal is produced in the signal generation unit 3 with the negative and positive relays 2a and 2b both kept in the passing state and the power-supply unit 13 kept in a current flow state, which allows the contact welding detection system 300 to determine the presence or absence of electrical leakage in the power-supply unit 13. In FIGS. 7-10, elements having similar functions as in the first embodiment are assigned the same numbers, except where specified otherwise.

Several advantages of the present embodiment will now be explained. The contact welding detection system 300 includes the positive relay 2b between the positive terminal of the DC power source 12 and the power-supply unit 13 and the negative relay 2a between the negative terminal of the DC power source 12 and the power-supply unit 13. This can lead to more reliable operation for isolation between the DC power source 12 and the power-supply unit 13.

In addition, in the contact welding detection system 300, the signal generation unit 3 is electrically connected to the main circuit 11 at the connection point A between the DC power source 12 and one of the main circuit relays 2. This, as described above, allows for switching between portions of the main circuits 11 for which the presence or absence of the electrical leakage is detected, thereby leading to enhanced performance of the leak detection system.

In addition, in the contact welding detection system 300, the signal generation unit 3 and the measurement unit 4 are electrically connected to the resistor 63 through the operation verification switch 51. This allows whether or not the welding determination unit 5 is operating correctly to be verified, thereby enhancing reliability of the contact welding detection system 300.

In addition, in the contact welding detection system 300, the movable contact part 23b of the positive relay 2b and the movable contact part 23a of the negative relay 2a are movable into and out of contact with their respective stationary contact parts 22b and 22a by a magneto-motive force of an electromagnetic coil 710 shared by the positive relay 2b and the negative relay 2a. This can lead to reduction of power consumption in the main circuit relays 2.

The contact welding detection system 300 includes the capacitor 16 electrically connected between the positive wiring 14 and the negative wiring 15, where one terminal of the capacitor 16 is electrically connected to the positive wiring 14 between the positive relay 2b and the power-supply unit 13 and the other terminal of the capacitor 16 is electrically connected to the negative wiring 15 between the negative relay 2a and the power-supply unit 13. With this configuration, in the presence of welding of the positive contact pair 21b only, the AC signal generated in the signal generation unit 3 can pass to the conductive member 61 through the current path P4 not including the power supply unit 13, as shown in FIG. 9. Therefore, even when the power-supply unit 13 is in the current non-flow state in which no current flows through the power-supply unit 13, the contact welding detection system 300 can detect the presence or absence of welding of the positive contact pair 21b, as well as the presence or absence of welding of the negative contact pair 21a.

Figure 11:
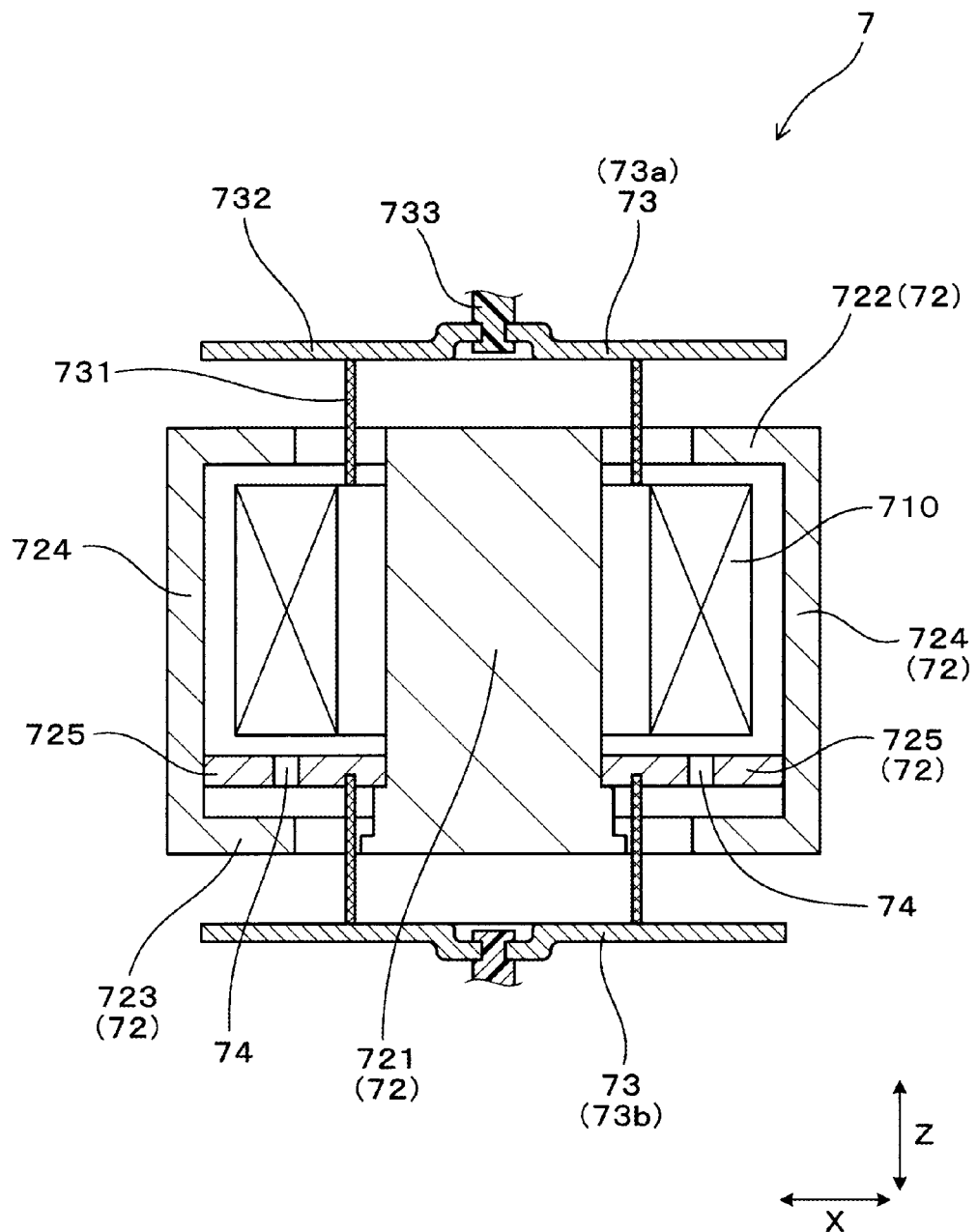
FIG. 11 is a partially sectional front view of a solenoid arrangement used for main circuit relays in accordance with the third embodiment.

In the present embodiment, for example, a solenoid arrangement 7 as shown in FIG. 11 may be used in the main circuit relay 2 including the positive relay 2b and the negative relay 2a. The solenoid arrangement 7 will now be explained with reference to FIG. 11. In FIG. 11, elements having similar functions as in the first embodiment are assigned the same numbers, except where specified otherwise.

As shown in FIG. 11, the solenoid arrangement 7 includes the shared electromagnetic coil 710, a stationary core 72 forming a portion of a magnetic circuit in which a magnetic flux is formed, two plungers 73 (a first plunger 73a and a second plunger 73b) that are oppositely located on both sides of the electromagnetic coil 710 in a direction of a winding axis of the electromagnetic coil 710. The plungers 73a and 73b are respectively movable toward or away from the stationary core in response to energization or de-energization of the electromagnetic coil 710.

The magnetic circuit includes a magnetoresistive portion 74 resistive to the magnetic flux formed in the magnetic circuit. The first and second plungers 73a, 73b are configured to be attracted to the stationary core 72 in response to energization of the electromagnetic coil 710 and then kept in the attracted state while the electromagnetic coil 710 is in a energized state.

The stationary core 72 is formed of a plurality of portions including a center core 721 that extends through the inside of the electromagnetic coil 710, two side cores 724 that are located radially outwardly of the electromagnetic coil 710 and oppositely to each other, top and bottom cores 722 and 723 magnetically connecting the side cores 724 and the first and second plungers 73a and 73b. The stationary core 72 further includes an intermediate core 725 located between the bottom core 723 and the electromagnetic coil 710 along the direction of the winding axis of the electromagnetic coil 710 to magnetically connect the side cores 724 and the center core 721.

In the following, the direction of the winding axis of the electromagnetic coil 710 may be referred to as a "Z-direction", and a direction in which the side cores 724 oppose each other may be referred to as an "X-direction".

The first plunger 73a includes a substantially disc-shaped magnetic member 732 and a protrusion 733 that protrudes outwardly from the center of the magnetic member 732 in the Z-direction. The protrusion 733 is made of a resin and connected to the movable contact part 23a of the negative circuit relay 2a (but not shown in FIG. 11). The plunger 73b is similar in configuration to the plunger 73a.

More specifically, when the first plunger 73a is attracted toward the center core 721, the movable contact part 23a of the negative relay 2a moves in contact with the stationary contact part 22a of the negative relay 2a in conjunction of movement of the first plunger 73a. The movable contact part 23a of the negative relay 2a is kept in contact with the stationary contact part 22a of the negative relay 2a while the first plunger 73a is attracted to the center core 721. Similarly, when the second plunger 73b is attracted toward the center core 721, the movable contact part 23b of the positive relay 2b moves in contact with the stationary contact part 22b of the positive relay 2b in conjunction of movement of the second plunger 73b. The movable contact part 23b of the positive relay 2b is kept in contact with the stationary contact part 22b of the positive relay 2b while the second plunger 73b is attracted to the center core 721.

A plunger biasing member 731 is provided between each of the first and second plungers 73a, 73b and the center core 721 to bias the plunger away from the center core 721. The plunger biasing member 731 may be formed of a coiled spring.

In addition, the intermediate core 725 has a magnetoresistive portion 74. In the present embodiment, the magnetoresistive portion 74 may be a gap (e.g., an air gap) for severing a portion of the stationary core 72 (particularly a portion of the intermediate core 725) along a direction of a flux path. Alternatively, the magnetoresistive portion 74 may be a smaller cross-sectional area portion, an cross-sectional area of which perpendicular to the direction of the flux path is less than cross-sectional areas of the other portions of the stationary core 72, or may be a lower-permeability material portion made of a resin or the like. Use of such a lower-permeability material portion can increase rigidity of the stationary core 72 as compared to use of the air gap for the magnetoresistive portion 74.

In the present embodiment, the magnetoresistive portion 74 is configured such that the reluctance caused by the magnetoresistive portion 74 is lower than the reluctance cased by an air gap formed when the first and second plungers 73 are spaced apart from the center core 721.

The operation of the solenoid arrangement 7 will now be explained. The electromagnetic coil 710 is energized when none of the first and second plungers 73a and 73b are attracted to the center core 721 (see FIG. 11). In the present embodiment, there will be formed first and second closed flux paths. The first closed path includes the center core 721, the first plunger 73a and the intermediate core 725, and the second closed flux path includes the first plunger 73a, the second plunger 73b and the center core 721. since the first closed flux path has a lower reluctance than the second closed flux path, a magnetic flux will be formed first in the first closed flux path. Accordingly, the first plunger 73a will first be attracted to the center core 721.

When the first plunger 73a is attracted to the center core 721, the reluctance of the second closed flux path including the first and second plungers 73a, 73b and the center core 721 will be reduced. Further, the magnetoresistive portion 74 formed in the intermediate core 725 will lead to a limited amount of magnetic flux formed in the first closed flux path, thereby leading to formation of a sufficient magnetic flux in the second closed flux path to allow the second plunger 23b to be subsequently attracted to the center core 721.

A sufficient amount of magnetic flux will thus be formed in each of the first and second flux paths, thereby allowing each of the first and second plungers 23a and 23b to be kept attracted to the center core 721 while the electromagnetic coil 710 is energized.

The solenoid arrangement 7 is configured such that a plurality of main circuit relays 2 are kept in the blocking state through the energization of the shared and single electromagnetic coil 710 and without using a plurality of electromagnetic coils 710, which can lead to reduction of power consumption of the system.

In addition, the magnetic circuit includes the magnetoresistive portion 74, which facilitates placing the plurality of main circuit relays 2 in the blocking state through energization of the electromagnetic coil 710. That is, proper positioning of the magnetoresistive portion 74 may lead to formation of magnetic fluxes produced by the electromagnetic coil 710 along a plurality of closed flux paths respectively including the plurality of plungers 73. This can effectively implement keeping the plurality of main circuit relays 2 in the blocking state through energization of the single electromagnetic coil 710.

This configuration may reduce variations in magnitude of magnetic flux formed along the two closed flux paths. This allows the two plungers 73 to be attracted in a stable manner without increasing the current flowing through the electromagnetic coil 710, thereby reducing power consumption required to keep the plurality of main circuit relays 2 in the blocking state.

Particularly, this configuration can significantly reduce the power consumption required to keep the plurality of plungers 73 (two plungers in the present embodiment) attracted to the stationary core 72 for a long time. More specifically, use of the solenoid arrangement 7 for the plurality of main circuit relays 2 electrically connected between the DC power source 12 and the power-supply unit 13 as in the present embodiment requires the two plungers 73 to be continuously attracted to the stationary core 72 to keep the main circuit relays 2 in the passing state. Hence, use of the single electromagnetic coil 710 to keep the main circuit relays 2 in the passing state may significantly reduce the power consumption as compared with use of a plurality of electromagnetic coils to keep the plurality of main circuit relays 2 in the passing state.

In addition, the solenoid arrangement 7 of the present embodiment including the single electromagnetic coil 710 can facilitate reducing manufacturing costs and downsizing of the system.

The solenoid arrangement 7 set forth above is configured such that the magnetoresistive portion 74 is a gap severing a portion of the stationary core 72 along a direction of a flux path. Alternatively, the solenoid arrangement 7 may be configured such that the magnetoresistive portion 74 is a smaller cross-sectional area portion which has a cross-sectional area perpendicular to the direction of the flux path less than cross-sectional areas of the other portions of the stationary core 72. Use of the smaller cross-sectional area portion for the magnetoresistive portion 74 may lead to a more complicated magnetic design as compared to use of the gap for the magnetoresistive portion 74. This is because attracting the plurality of plungers 73 to the stationary core 72 by using the single electromagnetic coil 710 and then keeping the plurality of plungers 73 attracted to the stationary core 72 will require magnetic saturation of the closed flux path including the previously attracted plunger 73 to the stationary core 72.

The reluctance of the smaller cross-sectional area portion is low at the beginning of the attraction of the plungers 73 to the stationary core 72. Near completion of the attraction of the plungers 73 to the stationary core 72, a gap between the plungers 73 and the center core 721 is reduced. The reluctance of the entire closed flux path is thereby reduced, and then the magnetic flux density at the smaller cross-sectional area portion is increased. Hence, the magnetic saturation of the closed flux path passing through the previously attracted plunger 73 is required to increase the reluctance of the smaller cross-sectional area portion. The reluctance of the magnetic circuit suitable to keep the plurality of the plungers 73 attracted to the single electromagnetic coil 710 requires proper positioning of the magnetic saturation region. However, since the B-H curve of the electromagnetic coil 710 varies with individuals, the magnetic design has to be made taking into account such a variation.

Use of the gap for the magnetoresistive portion 74 as in the present embodiment has advantages that it is easy to design a constant reluctance value by using a distance and an area of the gap.

In addition, the solenoid arrangement 7 is configured such that when the two plungers 73*a* and 73*b* are attracted toward the stationary core 72, the direction along which the plunger 73*a* is attracted to the stationary core 72 and the direction along which the plunger 73*b* is attracted to the stationary core 72 are opposite each other. The solenoid arrangement 7 configured as above can prevent both the plungers 73*a* and 73*b* from being displaced toward the stationary core 72 even when the solenoid arrangement 7 is subject to vibration while in use. For example, when the solenoid arrangement 7 is subject to vibration in the Z-direction and the first plunger 73*a* is thereby displaced toward the stationary core 72, the second plunger 73*b* will be displaced away from the stationary core 72. This can prevent both the two plungers 73*a* and 73*b* from being displaced toward the stationary core 72 and can therefore prevent the main circuit relays 2 from being placed in the passing state. This allows for more reliable operation for isolation between the DC power source 12 and the power-supply unit 13.

The solenoid arrangement 7 set forth above is merely one example. Alternatively, the main circuit relays 2 may be used that include a solenoid arrangement other than the solenoid arrangement 7 set forth above.

(Fourth Embodiment)

Figure 12:
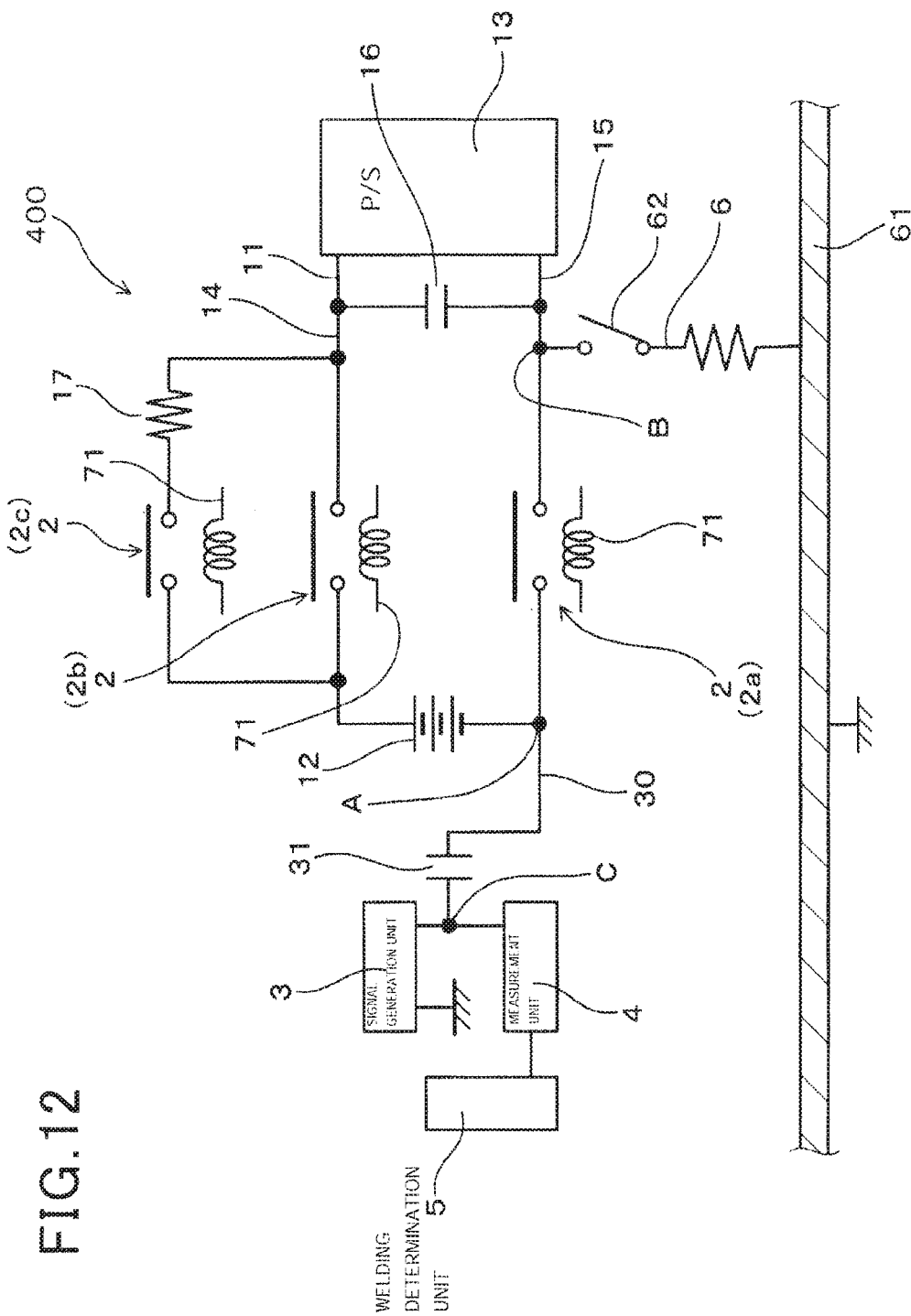
FIG. 12 is a schematic circuit diagram of a contact welding detection system in accordance with a fourth embodiment of the present invention.

There will now be explained a contact welding detection system 400 in accordance with a fourth embodiment of the present invention with reference to FIG. 12. The contact welding detection system 400 includes the negative relay 2*a*, the positive relay 2*b*, and a series connection of a precharge relay 2*c* and a resistor 17. The series connection of the precharge relay 2*c* and the resistor 17 is electrically connected in parallel with the positive relay 2*b*. The positive relay 2*b*, the negative relay 2*a* and the precharge relay 2*c* are configured to be individually switched between the passing state and the blocking state in response to energization or de-energization of their respective electromagnetic coils 71. The contact welding detection system 400 includes a capacitor 16. One terminal of the capacitor 16 is electrically connected to the positive wiring 14 between the positive relay 2*b* and the power-supply unit 13, and another terminal of the capacitor 16 is electrically connected to the negative wiring 15 between the negative relay 2*a* and the power-supply unit 13. In FIG. 12, elements having similar functions as in the first embodiment are assigned the same numbers, except where specified otherwise.

The contact welding detection system 400 is able to detect the presence or absence of contact welding in each of the positive relay 2*b*, the negative relay 2*a* and the precharge relay 2*c*.

In addition, the contact welding detection system 400 is able to test for the presence or absence of contact welding in the three main circuit relays 2 (the positive relay 2*b* the negative relay 2*a* and the precharge relay 2*c*) through switching of the first welding testing switch 62, which can lead to reduction in welding testing time. That is, without the first forced ground-contacting unit 6, it would be needed to test for the presence or absence of contact welding in the negative relay 2*a* and the precharge relay 2*c* with the positive relay 2*b* kept in the passing state, and then test for the presence or absence of contact welding in the positive relay 2*b* with the negative relay 2*a* or the precharge relay 2*c* kept in the passing state, which would lead to a longer testing time to accomplish the welding test for the three main circuit relays 2 (the positive relay 2*b* the negative relay 2*a* and the precharge relay 2*c*).

In a configuration such that the three main circuit relays 2 (the positive relay 2*b* the negative relay 2*a* and the precharge relay 2*c*) can be individually driven by their respective electromagnetic coils 71, welding test for the three main circuit relays 2 can somehow be conducted by individually controlling the their respective electromagnetic coils 71 as described in the introductory part of the present application. However, without the first forced ground-contacting unit 6, it would take a longer time to accomplish the welding test for the three main circuit relays 2. The contact welding detection system 400 of the fourth embodiment is able to test for the presence or absence of contact welding in a plurality of main circuit relays 2 at once through switching of the first welding testing switch 62. Therefore, for example, the contact welding detection system 400 can prevent a user of a vehicle mounting therein the system from feeling uncomfortable when the welding test is conducted upon start of the vehicle.

(Fifth Embodiment)

Figure 13:
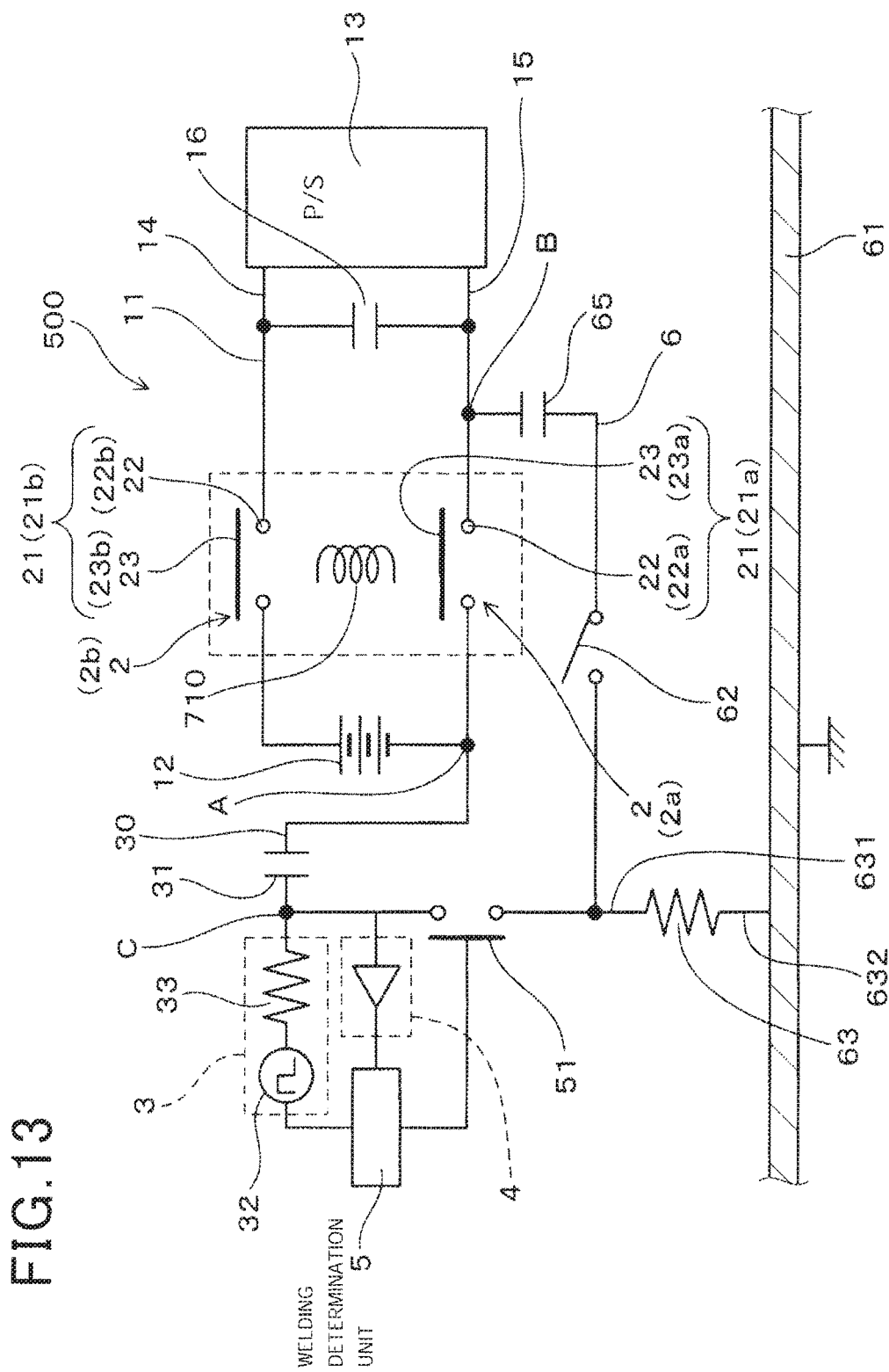
FIG. 13 is a schematic circuit diagram of a contact welding detection system in accordance with a fifth embodiment of the present invention.

There will now be explained a contact welding detection system 500 in accordance with a fifth embodiment with reference to FIG. 13. As shown in FIG. 13, the first forced ground-contacting unit 6 includes a series connection of the first welding testing switch 62 and a capacitor 65. Particularly, in the present embodiment, the capacitor 65 is electrically connected between the first welding testing switch 62 and the main circuit 11. In FIG. 13, elements having similar functions as in the third embodiment are assigned the same numbers, except where specified otherwise.

In the present embodiment, electrical isolation between the conductive member 61 and the main circuit 11 can be ensured this can prevent a voltage of the main circuit 11 from being applied to the conductive member 61, such as a vehicle body or the like. In addition, in the present embodiment, the capacitor 65 is electrically connected between the first welding testing switch 62 and the main circuit 11. This can protect the first welding testing switch 62 from a high-voltage of the main circuit 11.

Besides these advantages, the present embodiment can provide similar advantages as those indicated above for the third embodiment.

(Sixth Embodiment)

Figure 14:
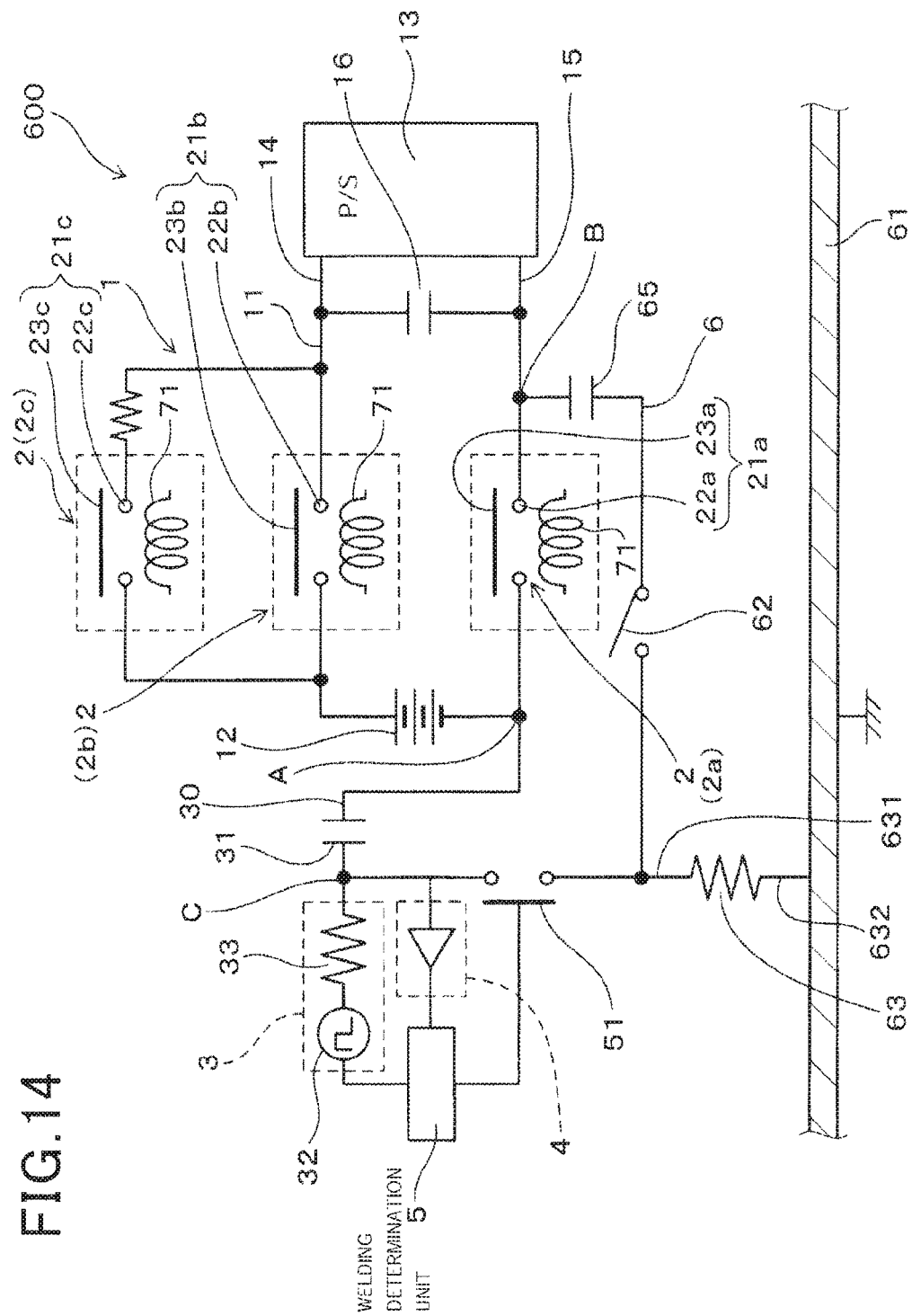
FIG. 14 is a schematic circuit diagram of a contact welding detection system in accordance with a sixth embodiment of the present invention.

There will now be explained a contact welding detection system 600 in accordance with a sixth embodiment with reference FIGS. 14 and 15. In the contact welding detection system 600, the main circuit 11 includes, as in the fourth embodiment, three main circuit relays 2 (the positive relay 2*b*, the negative relay 2*a* and the precharge relay 2*c*), and the first forced ground-contacting unit 6 includes, as in the fifth embodiment, the capacitor 65 electrically connected between the first welding testing switch 62 and the main circuit 11. In FIG. 14, elements having similar functions as in the fourth or fifth embodiment are assigned the same numbers, except where specified otherwise.

There will now be explained the operations of the contact welding detection system 600 with reference to a flowchart of FIG. 15. Testing for the presence or absence of contact welding in the main circuit relays 2 (the negative relay 2*a*, the positive relay 2*b*, and the precharge relay 2*c*) is conducted by controlling the energization of their respective electromagnetic coils 71 so that all the main circuit relays 2 are placed in the blocking state in step S1. In addition, the power-supply unit 13 is placed in a current non-flow state by controlling the switching elements therein, and the operation verification switch 51 is also placed in the blocking state.

In this state, in step S2, the first welding testing switch 62 is placed in the passing state. Thereafter, in step S3, the AC signal in the form of the square wave of a predetermined amplitude (voltage) is generated in the signal generation unit 3. The voltage value of this signal may hereinafter be referred to as a generated voltage value Vg. Step S2 may be preceded by step S3.

Subsequently, in step S4, a voltage value is measured in measurement unit 4. The voltage value measured in the measurement unit 4 (which may hereinafter be referred to as a measured voltage value Vm) may be comparable to the generated voltage value Vg, or may be less than the generated voltage value Vg.

In the absence of contact welding in the main circuit relays 2, even when the welding testing switch 62 is turned on, no current will pass to the conductive member 61 through a circuit from the capacitor 31 to the conductive member 61 through the main circuit 11 and the first forced ground-contacting unit 6 in this order as the main circuit is interrupted by the main circuit relays. That is, the impedance of this circuit is so high that the voltage at the connection point C, that is, the measured voltage value Vm remains almost at the generated voltage value Vg.

However, in the presence of contact welding in at least one of the main circuit relays 2, the AC current generated in the signal generation unit 3 can flow through the same circuit from the capacitor 31 to the conductive member 61 through the main circuit 11 and the first forced ground-contacting unit 6. Hence, the AC voltage measured at the connection point C, that is, the measured voltage value Vm, will be divided depending on the resistor 33 and the impedance of the same circuit from the capacitor 31 to the conductive member 61 through the main circuit 11 and the first forced ground-contacting unit 6. Therefore, the measured voltage value Vm will be lowered as compared to in the absence of contact welding in the main circuit relays 2.

In step S5, the welding determination unit 5 determines the presence or absence of contact welding in the main contact pairs on the basis of such differences in measured voltage value Vm. That is, if the measured voltage value Vm is equal to or greater than a threshold that is predetermined taking account of the generated voltage value Vg (see FIGS. 3 and 5), then it is determined in step S6 that no contact pairs in the main circuit relays 2 are welded. If the measured voltage value Vm is less than the predetermined threshold, then it is determined in step S7 that at least one of the main circuit relays 2 has suffered welded contacts.

It should be noted that the operation flows of the contact welding detection systems 100 to 500 are substantially similar to the operation flow of the contact welding detection system 600.

The contact welding detection system 600 of the present embodiment can provide similar advantages as in the contact welding detection systems 500 and 400.

(Seventh Embodiment)

There will now be explained a contact welding detection system 700 in accordance with a seventh embodiment with reference to FIGS. 16 and 17. The contact welding detection system 700 includes a charging circuit 110 and second forced ground-contacting units 60a and 60b, as well as the main circuit 11 and the first forced ground-contacting unit 6.

The charging circuit 110 includes a charger 130 for charging the DC power source 12, and two charging circuit relays 20 electrically connected between the DC power source 12 and the charger 130. The second forced ground-contacting units 60a and 60b are electrically connected between the conductive member 61 and the charging circuit 110.

The second forced ground-contacting units 60a and 60b respectively include second welding testing switches 620a and 620b for switching on and off the current flowing from the charging circuit 110 to the conductive member 61. The second welding testing switches 620a and 620b are respectively electrically connected to connection points D1 and D2 on the charging circuit 110, which points are located on the opposite side of the charging circuit relays 20 to the connection point A for the signal generation unit 3.

The charging circuit 110 includes, as the charging circuit relays 20, a positive charging relay 2e disposed in the positive charging line 140 and electrically connected between the positive terminal of the DC power source 12 and the charger 130, and a negative charging relay 2d disposed in the negative charging line 150 and electrically connected between the negative terminal of the DC power source 12 and the charger 130. In addition, the second forced ground-contacting unit 60b is electrically connected between the positive charging line 140 and the conductive member 61, and the second forced ground-contacting unit 60a is electrically connected between the negative charging line 150 and the conductive member 61.

The second forced ground-contacting units 60a and 60b respectively include capacitors 650a and 650b that are respectively electrically connected in series with the second welding testing switches 620a and 620b. The capacitor 650a is electrically connected between the second welding testing switch 620a and the charging circuit 110, and the capacitor 650b is electrically connected between the second welding testing switch 620b and the charging circuit 110.

The charging circuit 110 is electrically connected to the DC power source 12 in parallel with the main circuit 11. The charging circuit 110 is electrically connected to the signal generation unit 3 at the connection point A that is also the connection point A between the main circuit 11 and the signal generation unit 3.

Figure 16:
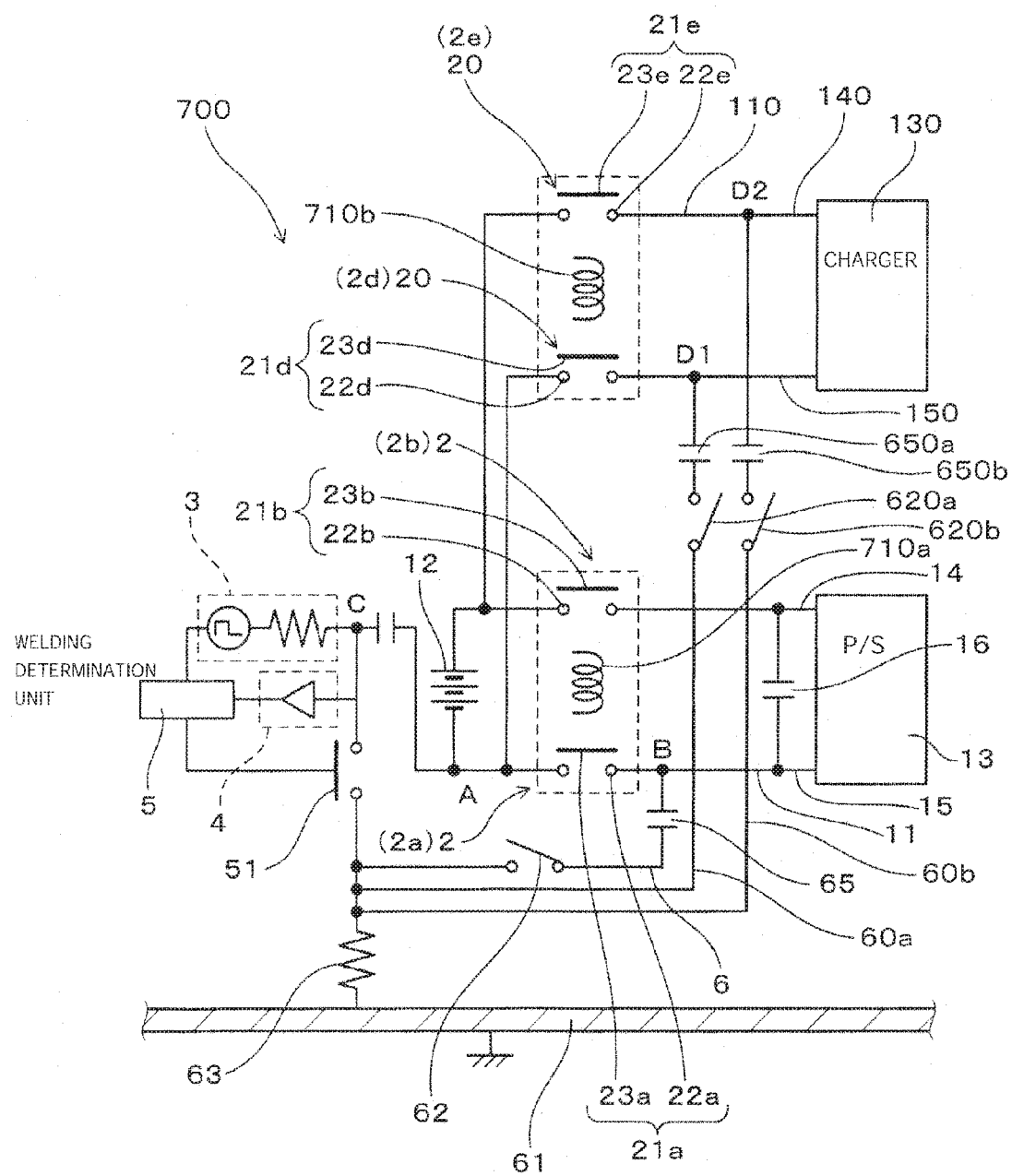
FIG. 16 is a schematic circuit diagram of a contact welding detection system in accordance with a seventh embodiment of the present invention.

In FIG. 16, elements having similar functions as in the fifth embodiment are assigned the same numbers, except where specified otherwise.

The contact welding detection system 700 of the present embodiment is capable of detecting the presence or absence of contact welding not only in the main circuit relays 2 (the negative relay 2a and the positive relay 2b), but also in the charging circuit relays 2d and 2e.

Testing for the presence or absence of contact welding in the charging circuit relays 20 may be followed by testing for the presence or absence of contact welding in the main circuit relays 2.

Testing for the presence or absence of contact welding in the main circuit relays 2 (the negative relay 2a and the positive relay 2b) is conducted by controlling the energization of their shared electromagnetic coil 710a so that both the negative relay 2a and the positive relay 2b are placed in the blocking state. Further, the power-supply unit 13 is placed in a current non-flow state by controlling the switching elements therein. Still further, the two second welding testing switches 620a and 620b are placed in the blocking state, and the charger 130 is also placed in a current non-flow state.

Figure 15:
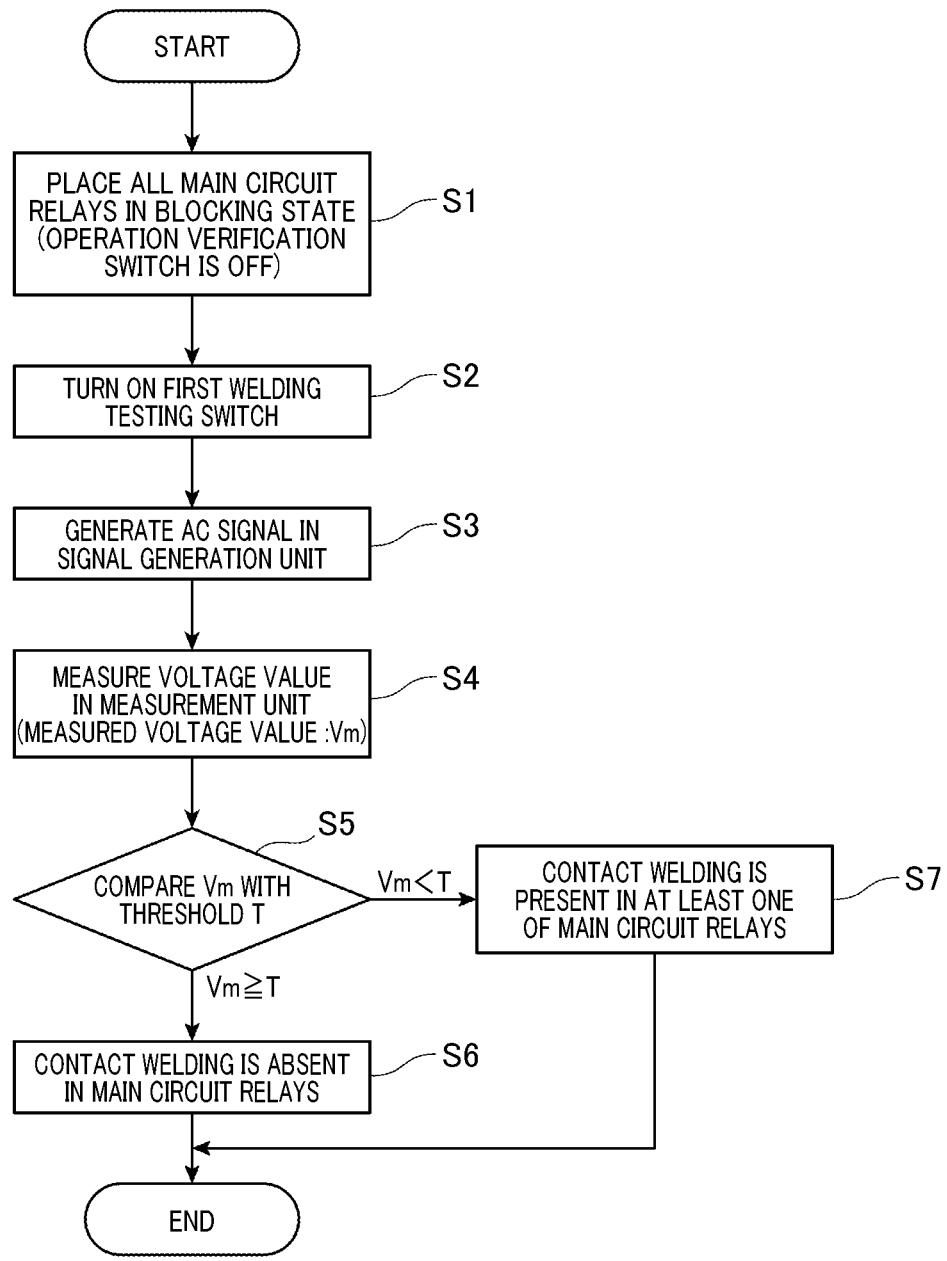
FIG. 15 is a flowchart of welding detection for main circuit relays of the contact welding detection system in accordance with the sixth embodiment.

In this state, the contact welding detection system 700 tests for the presence or absence of contact welding in the main circuit relays 2 according to a flowchart that is similar to the flowchart (including steps S2-S7) of the sixth embodiment as shown in FIG. 15.

Figure 17:
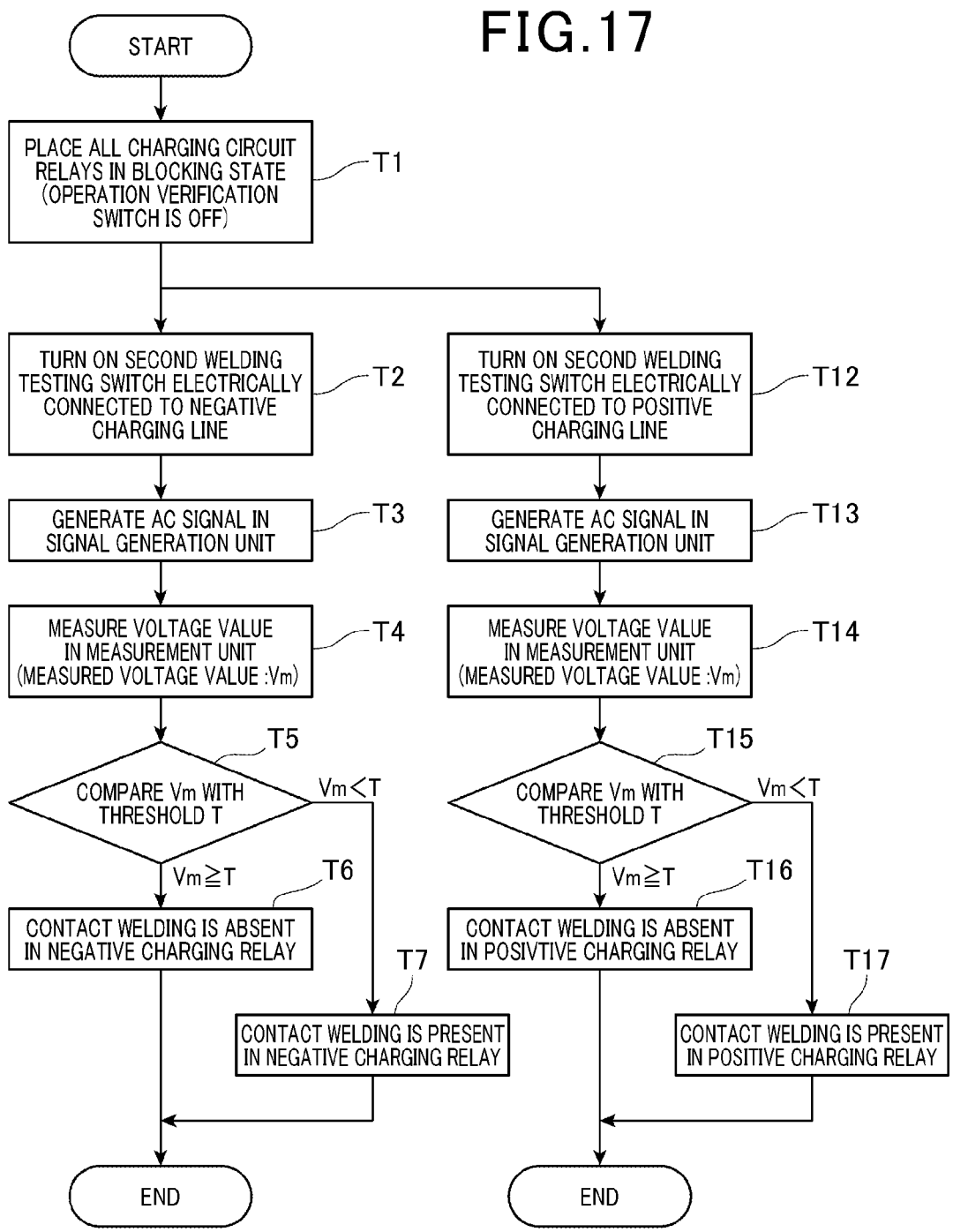
FIG. 17 is a flowchart of welding detection for charging circuit relays of the contact welding detection system in accordance with the seventh embodiment.

Testing for the presence or absence of contact welding in the charging circuit relays 20 (the negative charging relay 2d and the positive charging relay 2e) is conducted by controlling the energization of their respective electromagnetic coils 710b so that both the negative charging relay 2d and the positive charging relay 2e are placed in the blocking state in step T1 as shown in FIG. 17. In addition, the charging circuit 130 and the power-supply unit 13 are both placed in a current non-flow state.

In this state, in step T2, the second welding testing switch 620a electrically connected to the negative charging line 150 is placed in the passing state. Thereafter, in step T3, the AC signal in the form of the square wave of a predetermined amplitude (the generated voltage value Vg) is generated in the signal generation unit 3.

The welding determination unit 5 then compares the measured voltage value Win that is measured in the measurement unit 4 with the predetermined threshold T, thereby determining the presence or absence of contact welding in the negative charging relay 2d in steps T4, T5, T6, T7 in a similar manner as described in the sixth embodiment with reference to the flowchart of FIG. 15.

Similarly, testing for the presence or absence of contact welding in the positive charging relay 2e is conducted by controlling the energization of the electromagnetic coil 710b so that both the negative charging relay 2d and the positive charging relay 2e are placed in the blocking state in step T1. In this state, in step T12, the second welding testing switch 620b electrically connected to the positive charging line 140 is placed in the passing state. Thereafter, in step T13, the AC signal in the form of the square wave of a predetermined amplitude (the generated voltage value Vg) is generated in the signal generation unit 3. The welding determination unit 5 then compares the measured voltage value Vm that is measured in the measurement unit 4 with the predetermined threshold T, thereby determining the presence or absence of contact welding in the positive charging relay 2e in steps T14, T15, T16, T17.

In the present embodiment, as above, testing for the presence or absence of contact welding in the negative charging relay 2d is followed by testing for the presence or absence of contact welding in the positive charging relay 2e. Alternatively, testing for the presence or absence of contact welding in the negative charging relay 2d may be preceded by testing for the presence or absence of contact welding in the positive charging relay 2e.

As above, the contact welding detection system 700 is capable of detecting the presence or absence of contact welding not only in the main circuit relays 2 (2a and 2b), but also in the charging circuit relays 2d and 2e. The contact welding detection system 700 may be applied to a plug-in hybrid vehicle or an electrical vehicle or the like.

Besides these, the contact welding detection system 700 of the present embodiment can provide similar advantages as in the contact welding detection systems 500 of the fifth embodiment.

(Eighth Embodiment)

Figure 18:
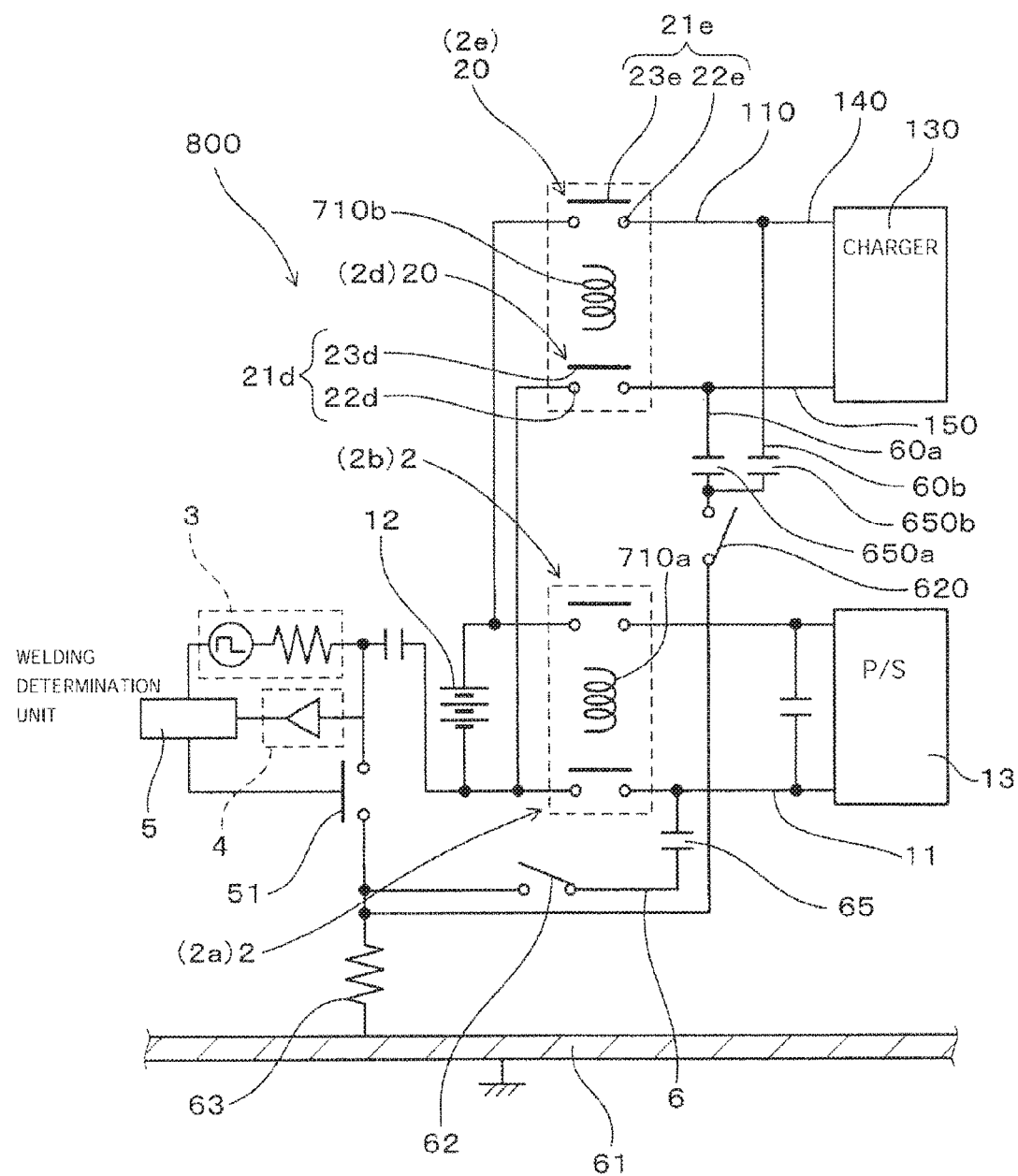
FIG. 18 is a schematic circuit diagram of a contact welding detection system in accordance with an eighth embodiment of the present invention.

There will now be explained a contact welding detection system 800 in accordance with a seventh embodiment with reference to FIGS. 18 and 19. As shown in FIG. 18, the contact welding detection system 800 is similar to the contact welding detection system 700 of the seventh embodiment, except that the two second forced ground-contacting units 60a and 60b share a second welding testing switch 620 that is electrically connected to the conductive member 61.

The second forced ground-contacting unit 60a includes the capacitor 650a between the shared second welding testing switch 620 and the negative charging line 150, and the second forced ground-contacting unit 60b includes the capacitor 650b between the shared second welding testing switch 620 and the positive charging line 140.

That is, the wiring from the charging circuit 110 side terminal of the second welding testing switch 620 bifurcates to form two wirings. One of the two wirings is electrically connected to the positive charging line 140 through the capacitor 650b, and the other one of the two wirings is electrically connected to the negative charging line 150 through the capacitor 650a.

In FIG. 18, elements having similar functions as in the seventh embodiment are assigned the same numbers, except where specified otherwise.

Figure 19:
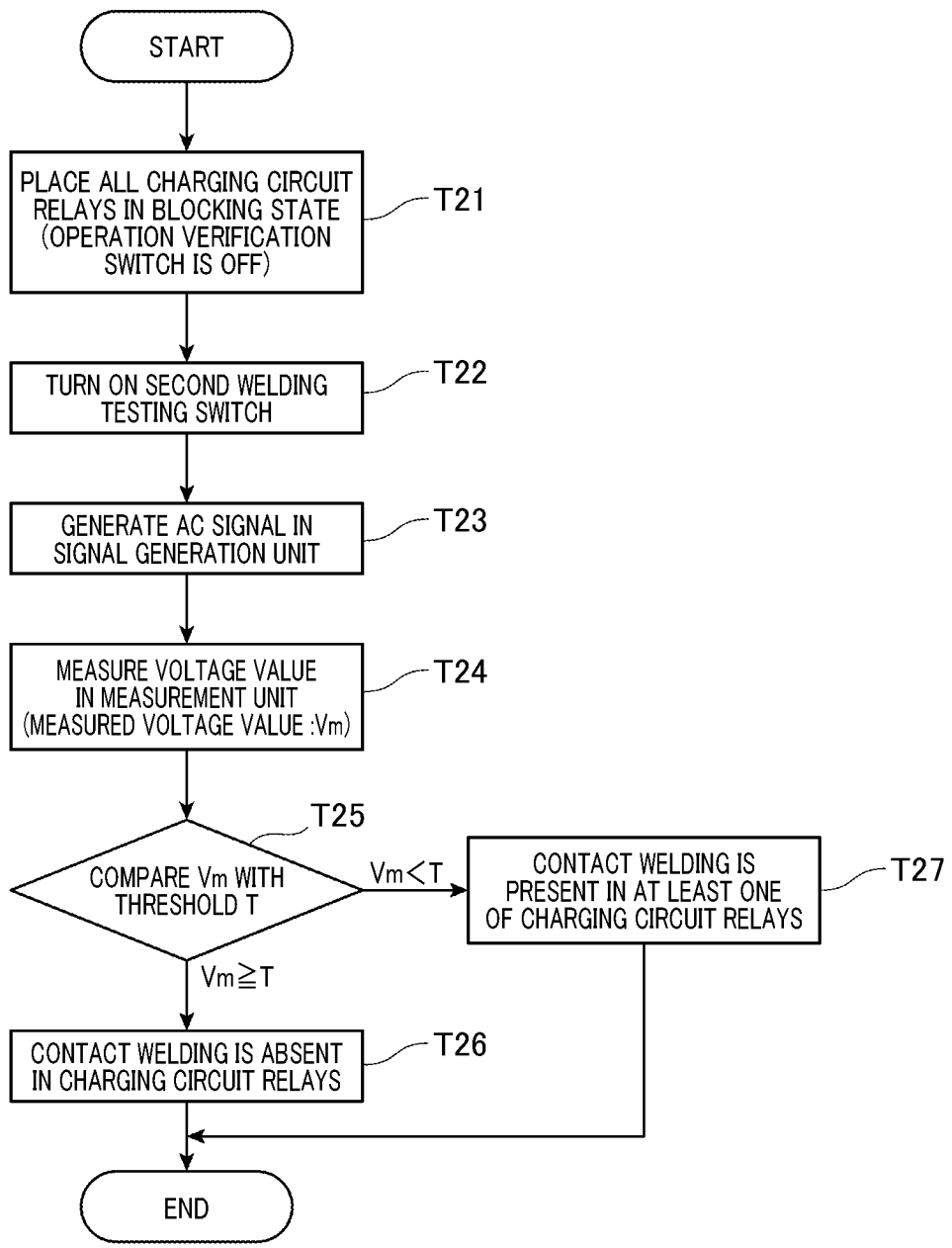
FIG. 19 is a flowchart of welding detection for charging circuit relays of the contact welding detection system in accordance with the eighth embodiment.

Testing for the presence or absence of contact welding in the charging circuit relays 20 (the negative charging relay 2d and the positive charging relay 2e) is conducted by controlling the energization of the shared electromagnetic coil 710b so that both the negative charging relay 2d and the positive charging relay 2e are placed in the blocking state in step T21 as shown in FIG. 19. This step T21 is similar to step T1 in the seventh embodiment.

In this state, in step T22, the shared second welding testing switch 620 is placed in the passing state. Thereafter, in step T23, the AC signal in the form of the square wave of a predetermined amplitude (the generated voltage value Vg) is generated in the signal generation unit 3.

The welding determination unit 5 then compares the measured voltage value Vm that is measured in the measurement unit 4 with the predetermined threshold T, thereby determining the presence or absence of contact welding in at least one of the negative charging relay 2d and the positive charging relay 2e in steps T24, T25, T26, T27 in a similar manner as described in the sixth embodiment with reference to the flowchart of FIG. 15.

In the present embodiment, it can be determined the presence or absence of contact welding in at least one of the negative charging relay 2d and the positive charging relay 2e.

In addition, only one second welding testing switch 620 is required for providing the contact welding detection system 800, which leads to simplification of the system with respect to the second forced ground-contacting units, and thus to an intended low-cost system.

Besides these, the contact welding detection system 800 of the present embodiment can provide similar advantages as in the contact welding detection systems 1 of the first embodiment.

(Ninth Embodiment)

Figure 20:
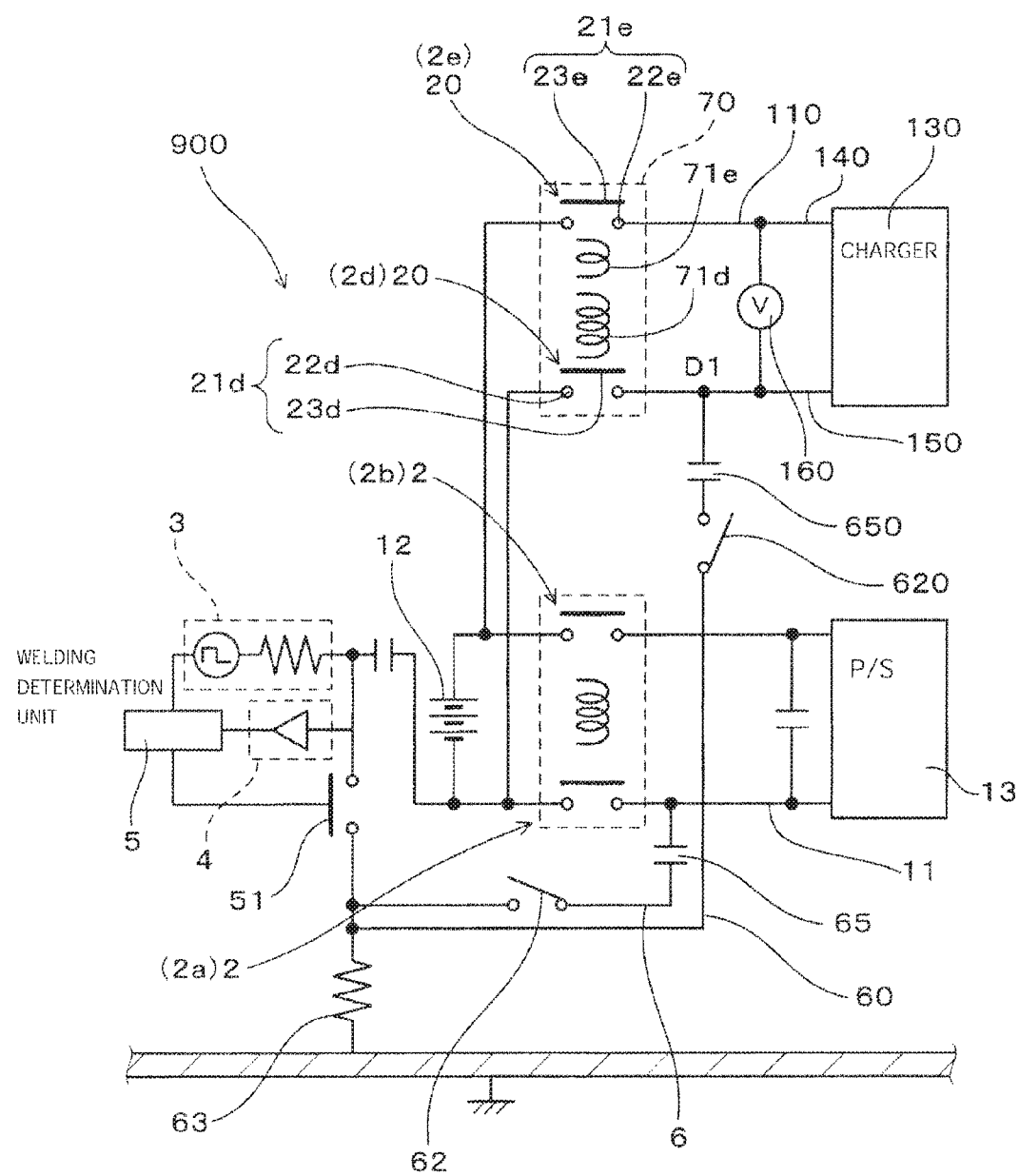
FIG. 20 is a schematic circuit diagram of a contact welding detection system in accordance with a ninth embodiment of the present invention.

There will now be explained a contact welding detection system 900 in accordance with a ninth embodiment with reference to FIGS. 20-26. As shown in FIG. 20, only one second forced ground-contacting unit 60 is electrically connected only to the negative charging line 150 that is one of the positive charging line 140 and the negative charging line 150. In the present embodiment, the second forced ground-contacting unit 60 is electrically connected between the negative charging line 150 and the conductive member 61.

The contact welding detection system 900 further includes a voltage sensor 160 electrically connected between the positive charging line 140 and the negative charging line 150. The voltage sensor 160 is electrically connected to the negative charging line 150 at a connection point that is located between the charger 130 and a connection point D1 at which the second forced ground-contacting unit 60 is electrically connected to the negative charging line 150.

In the present embodiment, two charging circuit relays 20 (the negative charging relay 2*d* and the positive charging relay 2*e*) share two electromagnetic coils 71*d* and 71*e* that form a solenoid arrangement 70. The solenoid arrangement 70 includes two contact pairs (first and second contact pairs 21*d* and 21*e*) as in the solenoid arrangement 7 of the third embodiment (see FIG. 11). As a difference from the solenoid arrangement 7 of the third embodiment, the solenoid arrangement 70 of the present embodiment is able to keep only the first contact pair 21*d* in the passing state, which will be described later. Conversely, the solenoid arrangement 70 of the present embodiment is unable to keep only the second contact pair 21*e* in the passing state. In the solenoid arrangement 70, the first contact pair 21*d* forms the negative charging relay 2*d* and the second contact pair 21*e* forms the positive charging relay 2*e*.

Figure 21:
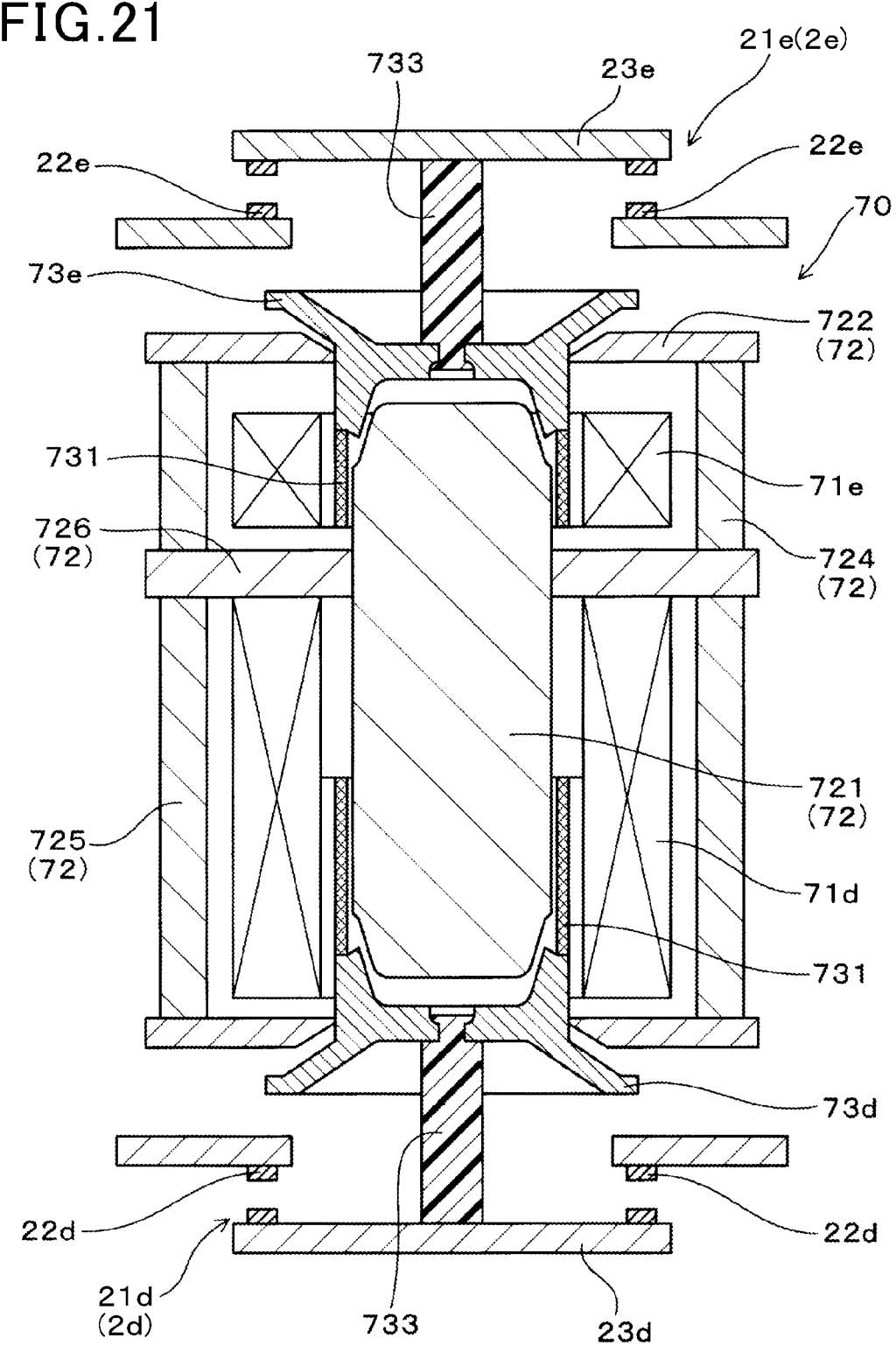
FIG. 21 is a sectional front view of a solenoid arrangement used for charging circuit relays where both contact pairs are in a blocking state in accordance with the ninth embodiment.
Figure 22:
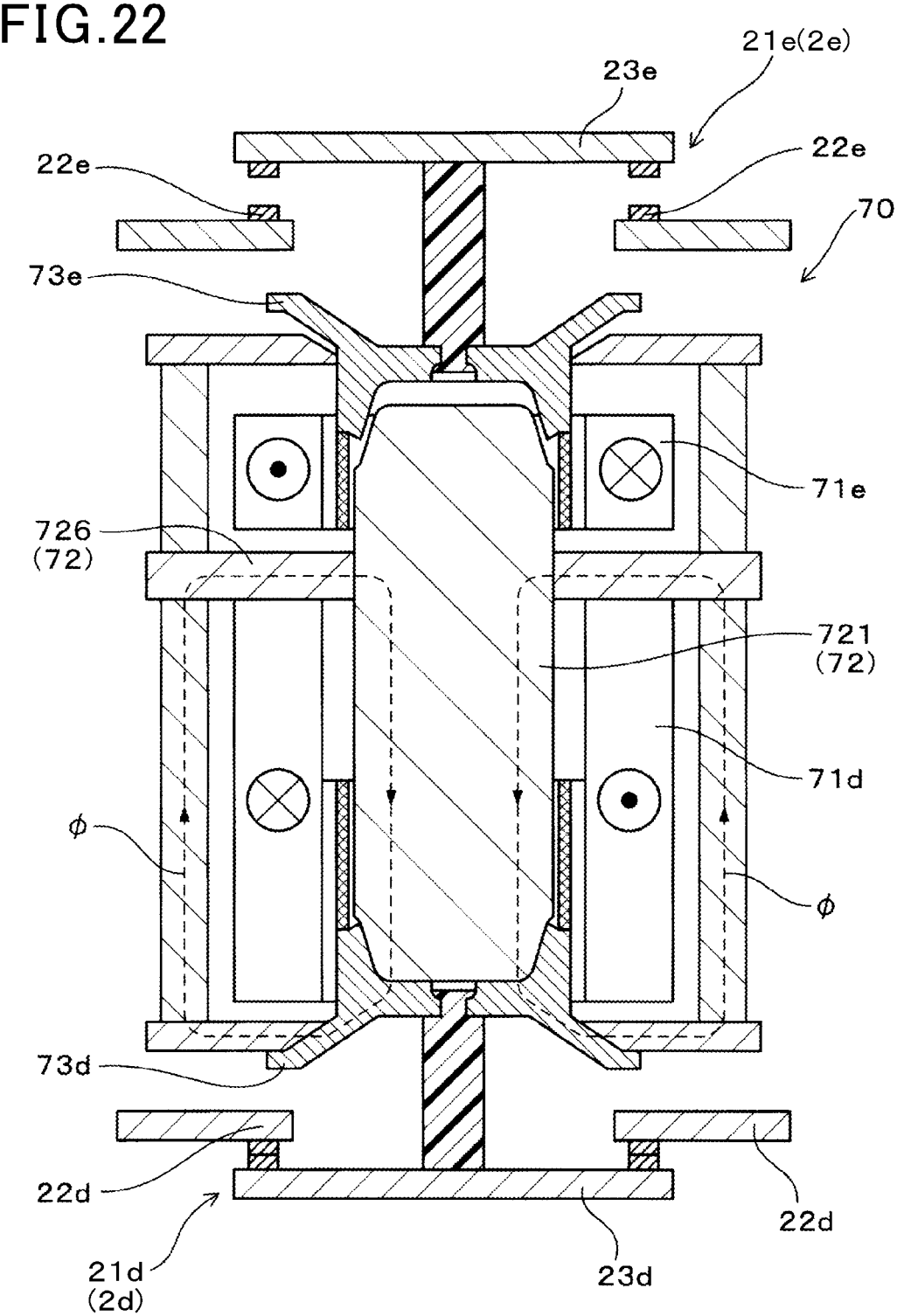
FIG. 22 is a sectional front view of the solenoid arrangement used for charging circuit relays where one of the contact pairs is in a passing state in accordance with the ninth embodiment.
Figure 23:
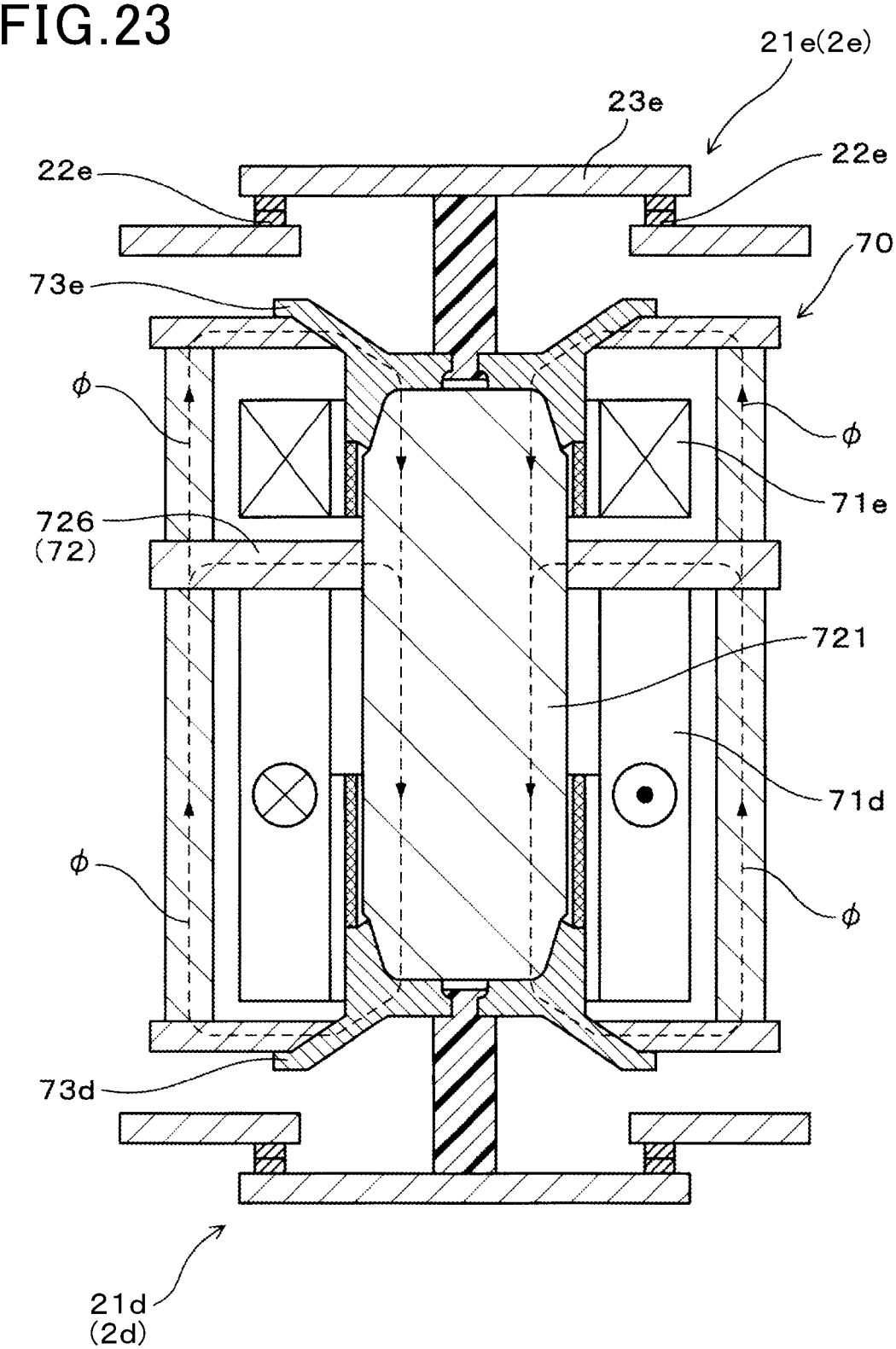
FIG. 23 is a sectional front view of the solenoid arrangement used for charging circuit relays where both contact pairs are in a passing state in accordance with the ninth embodiment.

As shown in FIG. 21, the solenoid arrangement 70 includes the first electromagnetic coil 71*d* with relatively high magneto motive force and the second electromagnetic coil 71*e* with magneto motive force lower than the first electromagnetic coil 71*d*. The first electromagnetic coil 71*d* and the second electromagnetic coil 71*e* are coaxially-arranged and have a center core 721 shared by and disposed inside these coils 71*e* and 71*d*. The solenoid arrangement 70 includes a mid core 726 between the first electromagnetic coil 71*d* and the second electromagnetic coil 71*e* as a portion of the stationary core 72. The mid core 726 includes a magnetic saturation section to bring the magnetic flux originating from the first electromagnetic coil 71*d* to saturation. Besides these, the solenoid arrangement 70 is similar to the solenoid arrangement 7 of the third embodiment (see FIG. 11). In FIGS. 21-23, elements having similar functions as in the third embodiment are assigned the same numbers, except where specified otherwise.

In the solenoid arrangement 70, when the first electromagnetic coil 71*d* and the second electromagnetic coil 71*e* are both de-energized, the movable contact parts 23*d* and 23*e* are respectively urged away from the stationary contact parts 22*d* and 22*e* by the first plunger 73*d* and the second plunger 73*e*. Both the first contact pair 21*d* and the second contact pair 21*e* are thereby placed in the blocking state. In this state, the first electromagnetic coil 71*d* and the second electromagnetic coil 71*e* are both energized, where current conduction directions for the first electromagnetic coil 71*d* and the second electromagnetic coil 71*e* are opposite each other as shown in FIG. 22.

The energization of the first electromagnetic coil 71*d* will lead to formation of a magnetic flux φ along a closed flux path through the first plunger 73*d*. The first plunger 73*d* will thereby be attracted to the center core 721, which allows the first contact pair 21*d* to be placed in the passing state.

Without energization of the second electromagnetic coil 71*e*, saturation of the magnetic flux φ caused by the energization of the first electromagnetic coil 71*d* at the mid core 726 would lead to formation of a magnetic flux along a closed flux path through the second plunger 73*e*.

In the present embodiment, as above, the second electromagnetic coil 71*e* is energized with its current conduction direction opposite the current conduction direction of the first electromagnetic coil 71*d*. The magnetic flux φ caused by the energization of the first electromagnetic coil 71*d* will thereby be compensated for by the magnetic flux caused by the energization of the second electromagnetic coil 71*e* along the closed flux path through the second plunger 73*e*. This will prevent formation of the magnetic flux along the closed path through the second plunger 73*e*. Hence, the second plunger 73*e* will not be attracted to the center core 721, and the second contact pair 21*e* will be kept in the blocking state. That is, the first contact pair 21*d* in the negative charging relay 2*d* is placed in the passing state with the second contact pair 21*e* kept in the blocking state (see FIG. 26).

While only the first plunger 73*d* is attracted to the center core 721, the second electromagnetic coil 71*e* is de-energized with the first electromagnetic coil 71*d* kept in the energized state as shown in FIG. 23. A magnetic flux φ from the first electromagnetic coil 71*d* will be formed also along a closed flux path through the second plunger 73*e*, which allows the second plunger 73*e* to also be attracted to the center core 721. Both the negative charging relay 2*d* in the first contact pair 21*d* and the second contact pair 21*e* in the positive charging relay 2*e* are thereby allowed to be placed in the passing state. Besides these, the solenoid arrangement 70 is similar in configuration as in the seventh embodiment. In FIGS. 20-26, elements having similar functions as in the seventh embodiment are assigned the same numbers, except where specified otherwise.

Figure 24:
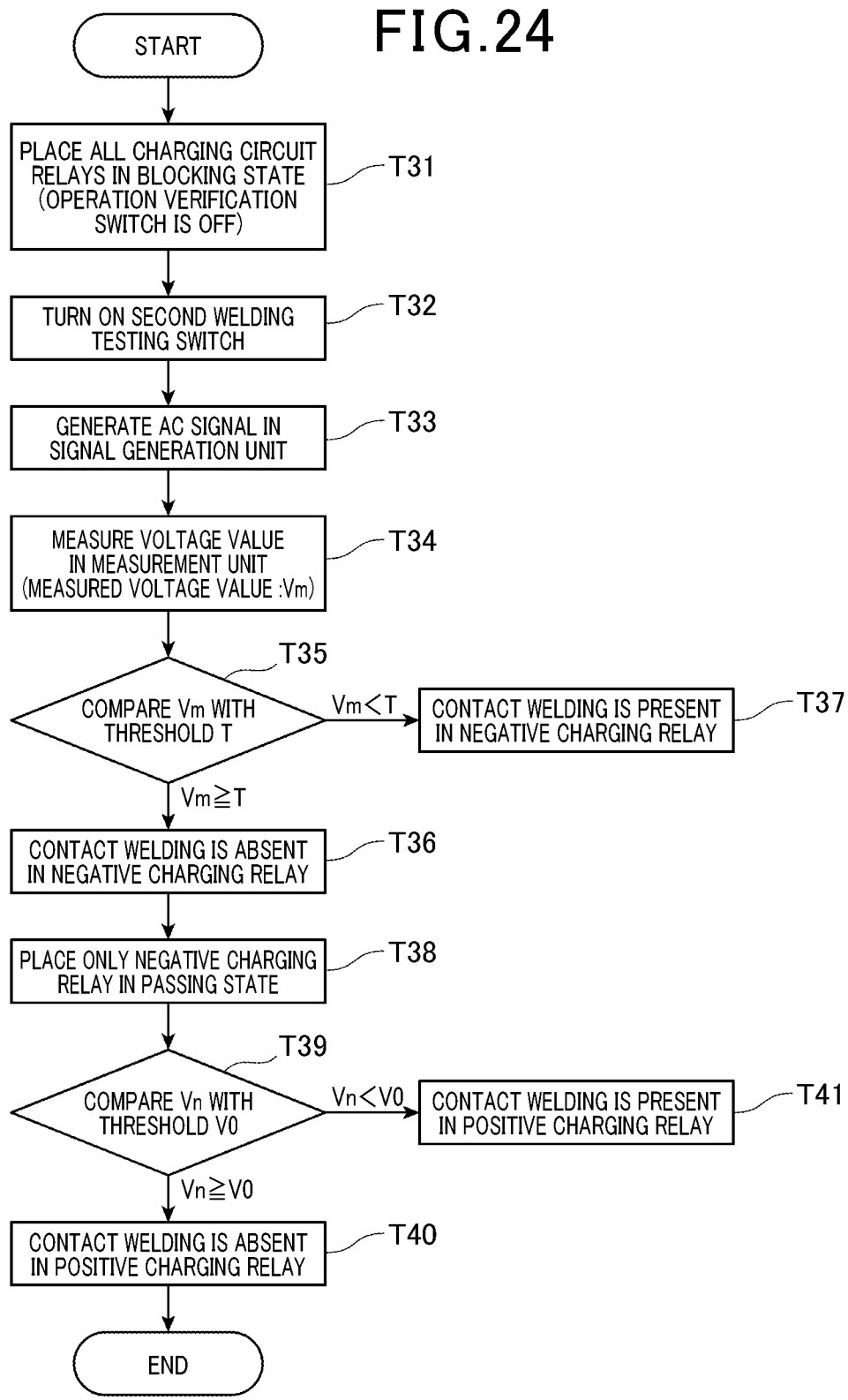
FIG. 24 is a flowchart of welding detection for charging circuit relays of the contact welding detection system in accordance with the ninth embodiment.

In the present embodiment, testing for the presence or absence of contact welding in the charging circuit relays 20 (the negative charging relay 2*d* and the positive charging relay 2*e*) is conducted by controlling the energization of the shared electromagnetic coils 71*d* and 71*e* so that both the negative charging relay 2*d* and the positive charging relay 2*e* are placed in the blocking state in step T31 as shown in a flowchart of FIG. 24. More specifically, in step T31, the first electromagnetic coil 71*d* and the second electromagnetic coil 71*e* are both de-energized, and both the negative charging relay 2*d* and the positive charging relay 2*e* are thereby placed in the blocking state as shown in FIG. 21.

Figure 25:
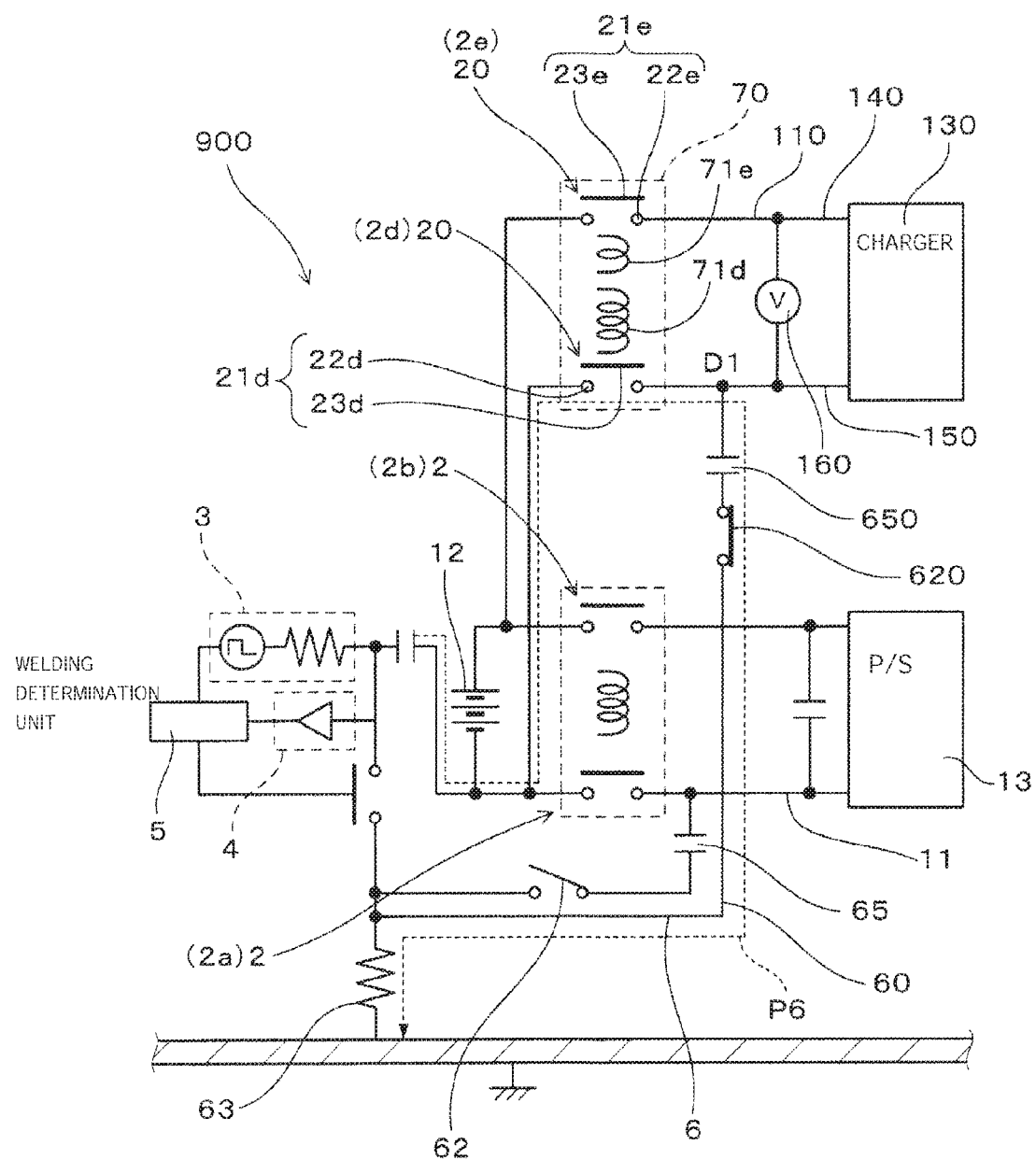
FIG. 25 is a schematic circuit diagram of the contact welding detection system during welding detection for a first contact pair in accordance with the ninth embodiment.

Subsequently, as shown in FIG. 25, the second welding testing switch 620 is placed in the passing state in step T32, and then in step T33, the AC signal in the form of the square wave of a predetermined amplitude (the generated voltage value Vg) is generated in the signal generation unit 3.

The welding determination unit 5 then compares the measured voltage value Vm that is measured in the measurement unit 4 with the predetermined threshold T, thereby determining the presence or absence of contact welding in the negative charging relay 2*d* in steps T34, T35, T36, T37 in a similar manner as described in the sixth embodiment with reference to the flowchart of FIG. 15. In FIG. 25, a current path indicated by the dashed arrow P6 is a current path through which the AC signal passes in the presence of contact welding in the negative charging relay 2*d*.

Figure 26:
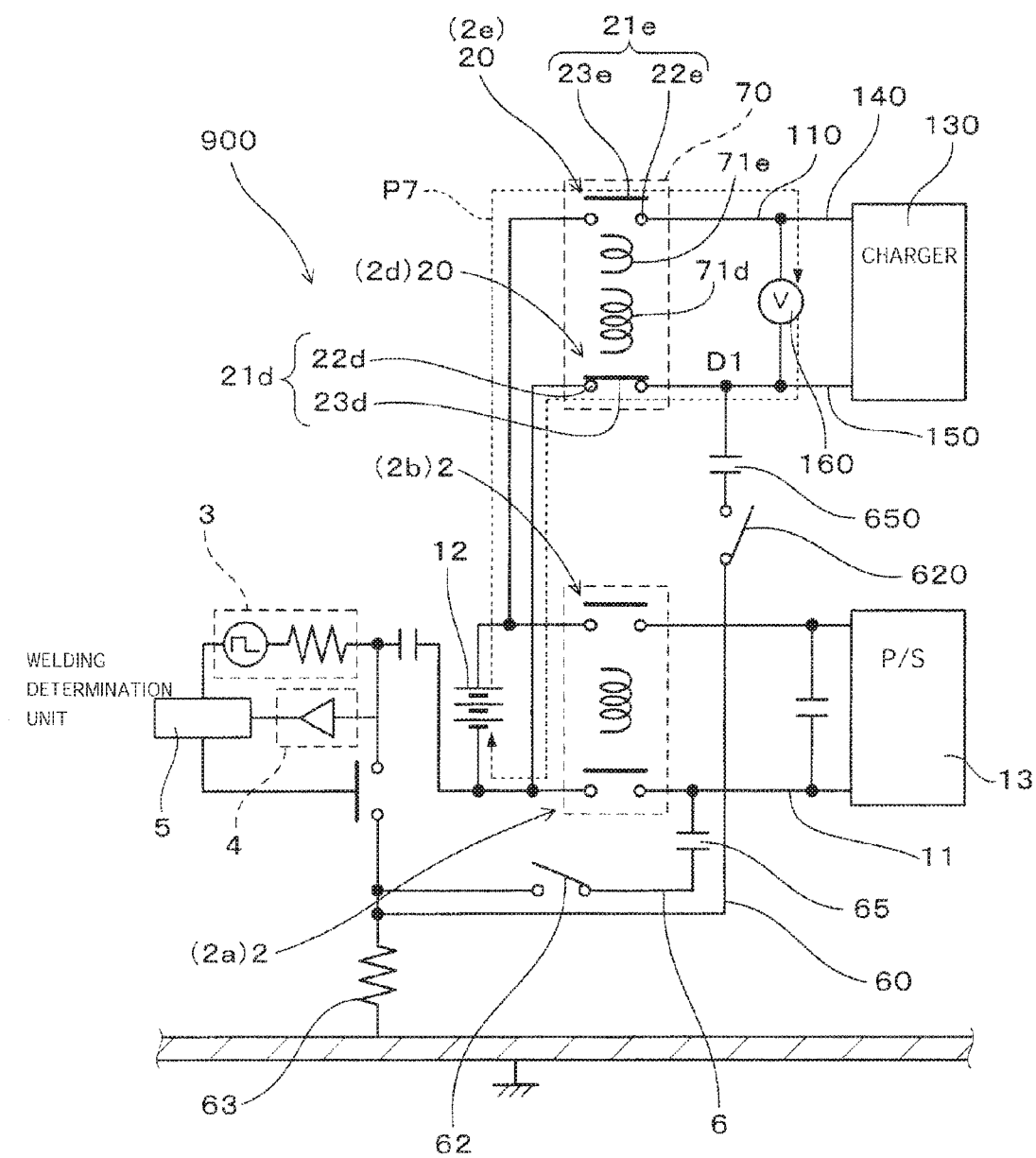
FIG. 26 is a schematic circuit diagram of the contact welding detection system during welding detection for a second contact pair in accordance with the ninth embodiment.

In addition, while the first electromagnetic coil 71*d* and the second electromagnetic coil 71*e* are both de-energized in the solenoid arrangement 70, the first electromagnetic coil 71*d* and the second electromagnetic coil 71*e* are both energized with their current conduction directions opposite each other as shown in FIG. 22. The solenoid arrangement 70 is thereby controlled such that only the first contact pair 21*d* in the negative charging relay 2*d* is placed in the passing state as shown in FIGS. 22 and 26 in step T38.

In this state, the voltage value Vn measured by the voltage sensor 160 is compared with a threshold V0 that is set taking into account a voltage value Vf of the DC power source 12 in step T39. For example, the threshold V0 may be set slightly less than the voltage value Vf of the DC power source 12 such that the voltage value Vn may be above or below the threshold V0 in response to the presence or absence of contact welding in the positive charging relay 2*e*.

The welding determination unit 5 compares the voltage value Vn with the threshold V0, and when the voltage value Vn becomes less than the threshold V0, determines that contact welding is present in the positive charging relay 2e. When the voltage value Vn is comparable to the threshold V0, the welding determination unit 5 determines that contact welding is absent in the positive charging relay 2e. In FIG. 26, a current path indicated by the dashed arrow P7 is a current path through which the AC signal passes in the presence of contact welding in the positive charging relay 2e.

With the contact welding detection system 900 of the present embodiment, a power consumption of the solenoid arrangement 70 can be reduced. Besides these, the contact welding detection system 900 can provide similar advantages as in the seventh embodiment.

(Tenth Embodiment)

Figure 27:
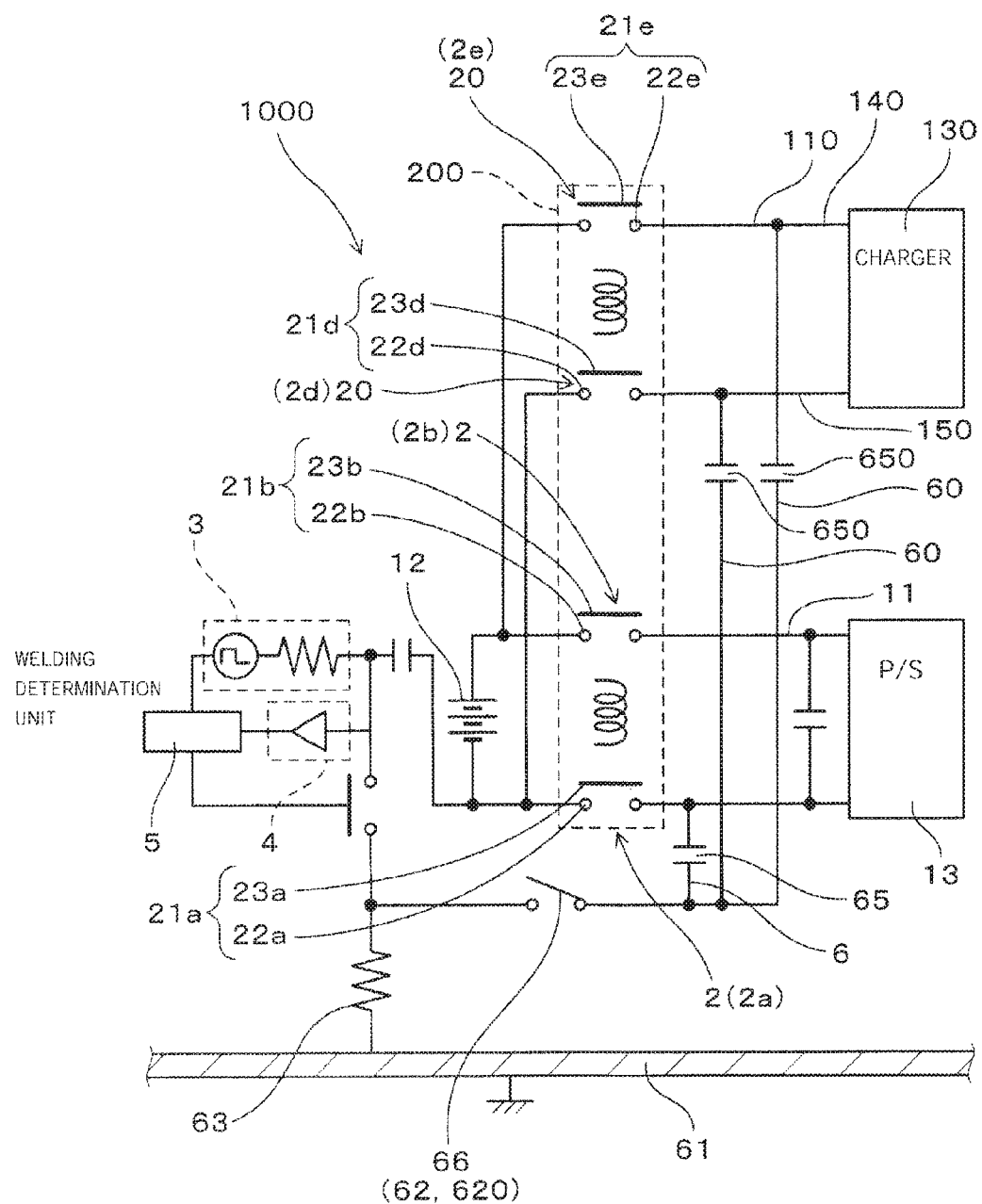
FIG. 27 shows a schematic circuit diagram of a contact welding detection system in accordance with a tenth embodiment of the present invention.

There will now be explained a contact welding detection system 1000 in accordance with a tenth embodiment with reference to FIG. 27. As shown in FIG. 27, the first forced ground-contacting unit 6 and the second forced ground-contacting unit 60 share a single testing switch 66 as the first welding testing switch 62 and the second welding testing switch 620, respectively. One terminal of the shared testing switch 66 is electrically connected to the conductive member 61 through the resistor 63. Another terminal of the shared testing switch 66 is branched into three wirings. One of the three wirings is electrically connected to the main circuit 11 through the capacitor 65. The other two wirings are respectively electrically connected to the positive charging line 140 and the negative charging line 150 of the charging circuit 110 through their respective capacitors 650.

Besides these, the contact welding detection system 1000 is similar in configuration as in the seventh embodiment. In FIG. 27, elements having similar functions as in the seventh embodiment are assigned the same numbers, except where specified otherwise.

In the present embodiment, testing for the presence or absence of contact welding in the main circuit relays 2 and testing for the presence or absence of contact welding in charging circuit relays 20 are to be conducted by using the single shared testing switch 66. First, the two main circuit relays 2 and the two charging circuit relays 20 are all placed in the blocking state by controlling energization of their respective electromagnetic coils. Thereafter, the AC signal in the form of the square wave of a predetermined amplitude is generated in the signal generation unit 3. When the voltage value measured in the measurement unit 4 is less than the threshold, it is determined that contact welding is present in at least one of the two main circuit relays 2 and the two charging circuit relays 20.

The present embodiment is advantageous, particularly when the two main circuit relays 2 and the two charging circuit relays 20 are constructed as a single relay unit 200. In the present embodiment, the number of components can be reduced, which may lead to a simplified contact welding detection system. Besides these, the contact welding detection system 1000 is similar in configuration as in the seventh embodiment.

(Eleventh Embodiment)

Figure 28:
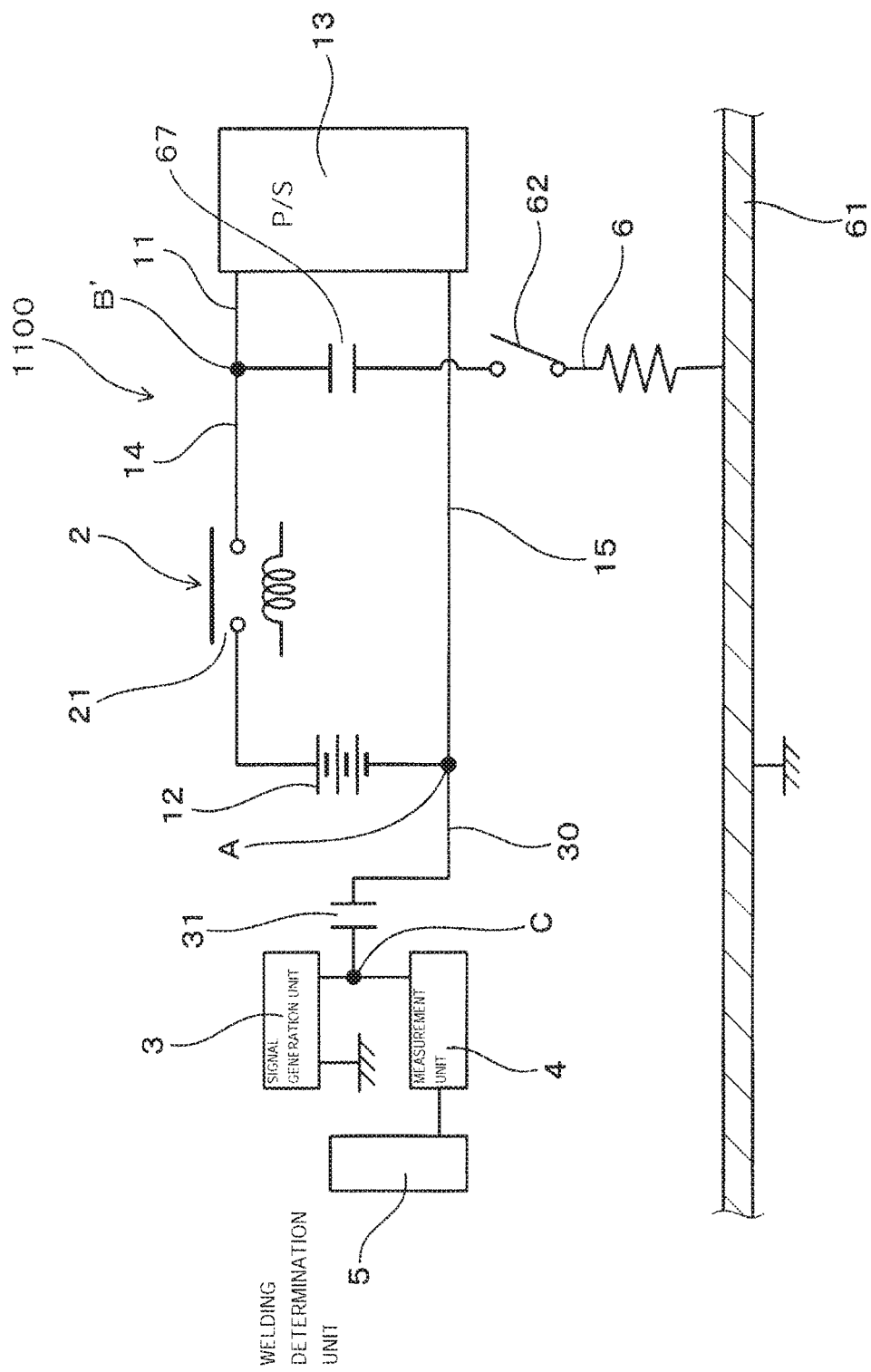
FIG. 28 shows a schematic circuit diagram of a contact welding detection system in accordance with an eleventh embodiment of the present invention.

FIG. 28 shows a contact welding detection system 1100 in accordance with an eleventh embodiment of the present invention, which is similar in configuration to the contact welding detection system 200 of the second embodiment (see FIGS. 6A and 6B) except that the first forced ground-contacting unit 6 further includes a capacitor 67 electrically connected in series with the first welding testing switch 62. One terminal of the capacitor 67 is electrically connected to the positive wiring 14 at the connection point B', and another terminal of the capacitor 67 is electrically connected to the first welding testing switch 62, as shown in FIG. 28.

In FIG. 28, elements having similar functions as in the second embodiment are assigned the same numbers, except where specified otherwise.

Figure 29:
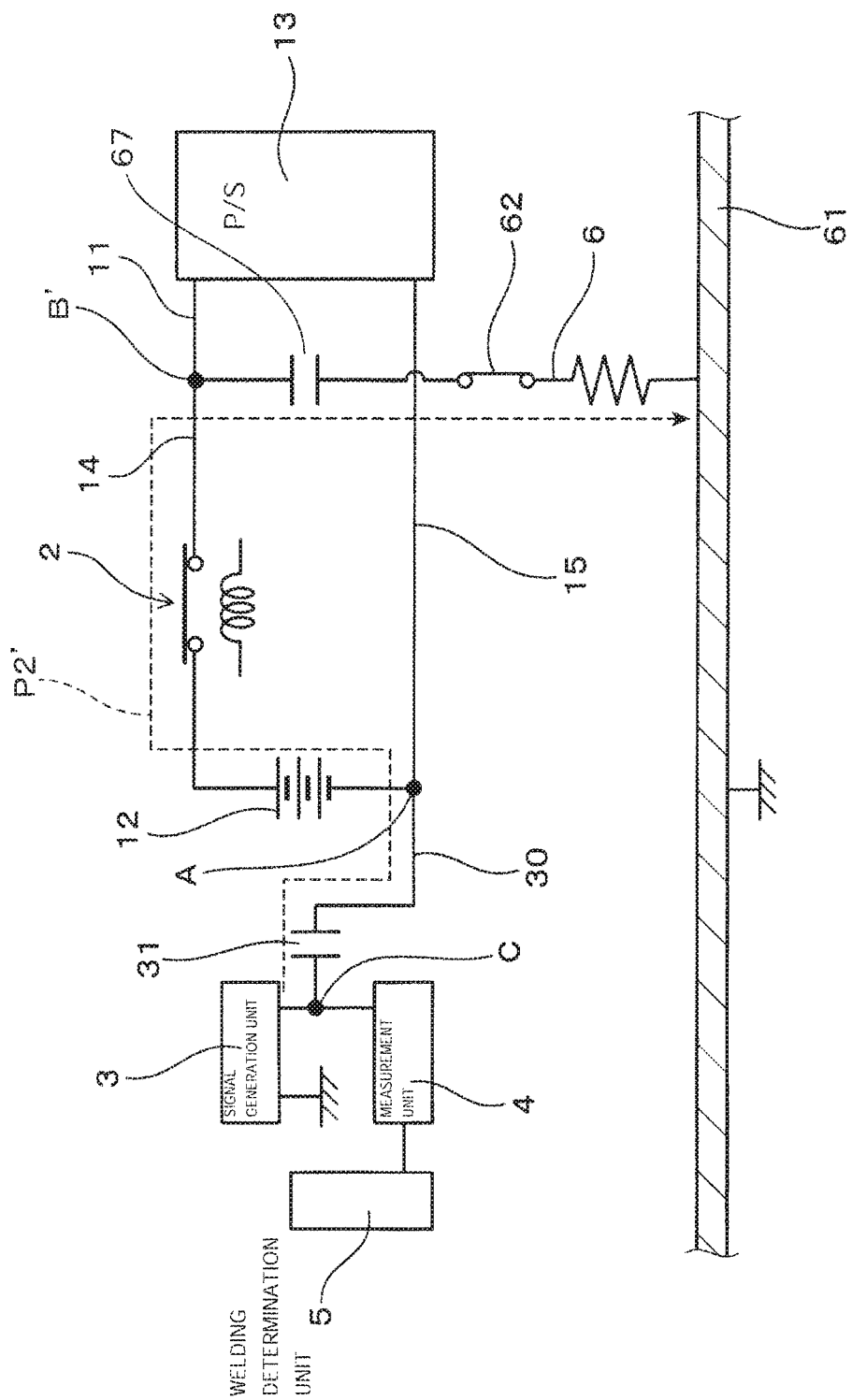
FIG. 29 is a schematic circuit diagram showing a current path of an AC signal in the presence of contact welding in main circuit relays in accordance with the eleventh embodiment.

As in the second embodiment, in the presence of welding of the contact pair 21 in the main circuit relay 2, the AC signal generated in the signal generation unit 3 will pass to the conductive member 61 through the connection point C, the connection point A, the DC power source 12, the main circuit relay 2, the connection point B', and the first forced ground-contacting unit 6 in this order along a current path P2' as shown in FIG. 29. Also in the present embodiment, the voltage value measured in the measurement unit 4 will change in response to the presence or absence of welding of the contact pair 21 in the main circuit relay 2. This allows the welding determination unit 5 to determine the presence or absence of welding of the contact pair 21 in the main circuit relay 2 on the basis of the measured voltage value. The same advantages as those indicated above for the second embodiment also apply to the second embodiment.

(Twelfth Embodiment)

Figure 30:
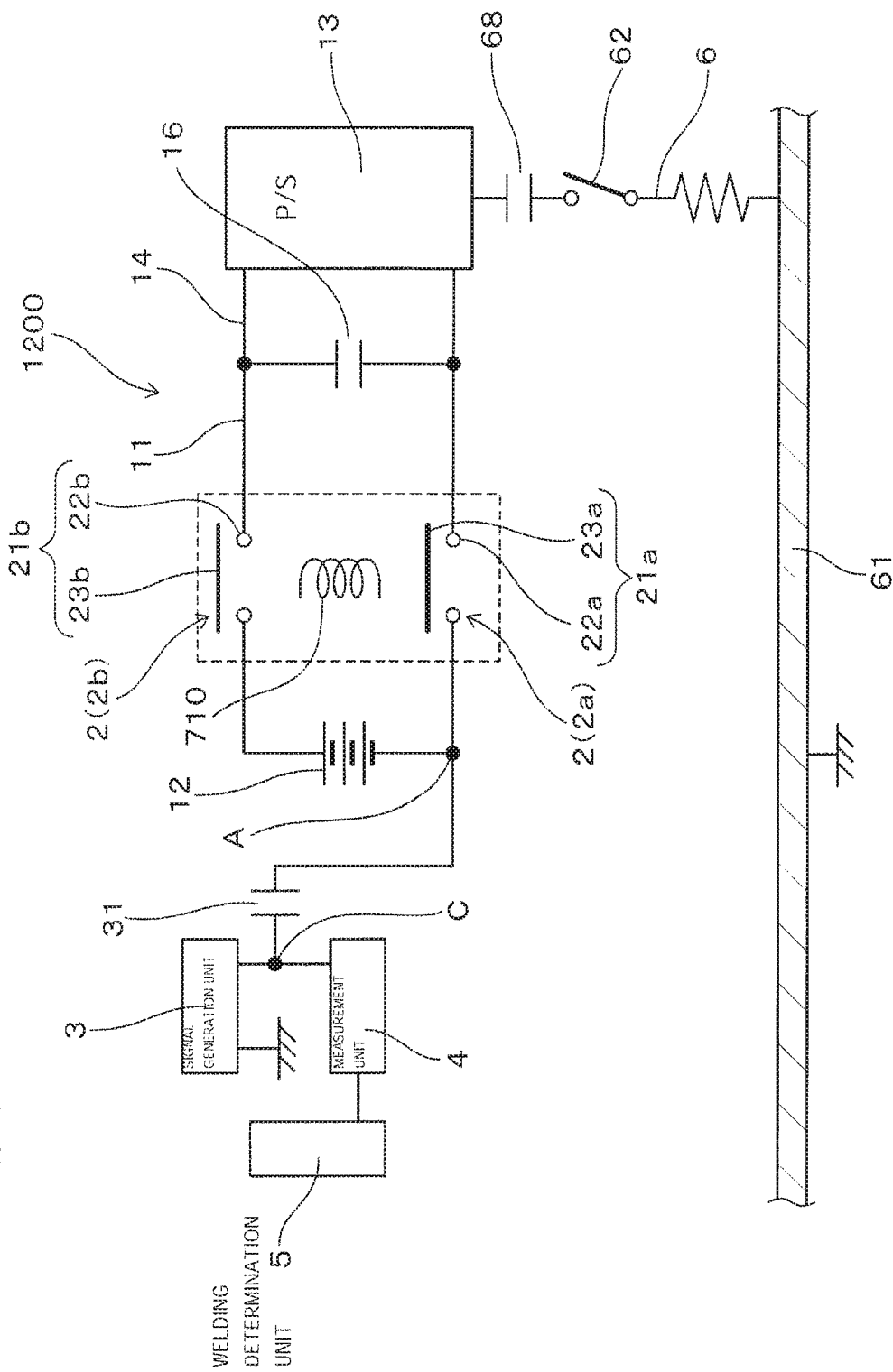
FIG. 30 is a schematic circuit diagram of a contact welding detection system in accordance with a twelfth embodiment of the present invention.

FIG. 30 shows a contact welding detection system 1200 in accordance with a twelfth embodiment of the present invention, which is similar in configuration to the contact welding detection system 1 of the first embodiment except that the first forced ground-contacting unit 6 is electrically connected between the power-supply unit 13 and the conductive member 61 and the first forced ground-contacting unit 6 further includes a capacitor 68 electrically connected in series with the first welding testing switch 62. Further, as in the third embodiment, the main circuit 11 includes two main circuit relays 2: a positive relay 2b provided in the positive wiring 14 and a negative relay 2a provided in the negative wiring 15.

In FIG. 30, elements having similar functions as in the first and third embodiments are assigned the same numbers, except where specified otherwise.

In the presence of contact welding in at least one of the two main circuit relays 2, the AC signal generated in the signal generation unit 3 will pass to the conductive member 61 through the power-supply unit 13 and the first forced ground-contacting unit 6. The same advantages as those indicated above for the first embodiment also apply to the present embodiment.

(Thirteenth Embodiment)

Figure 31:
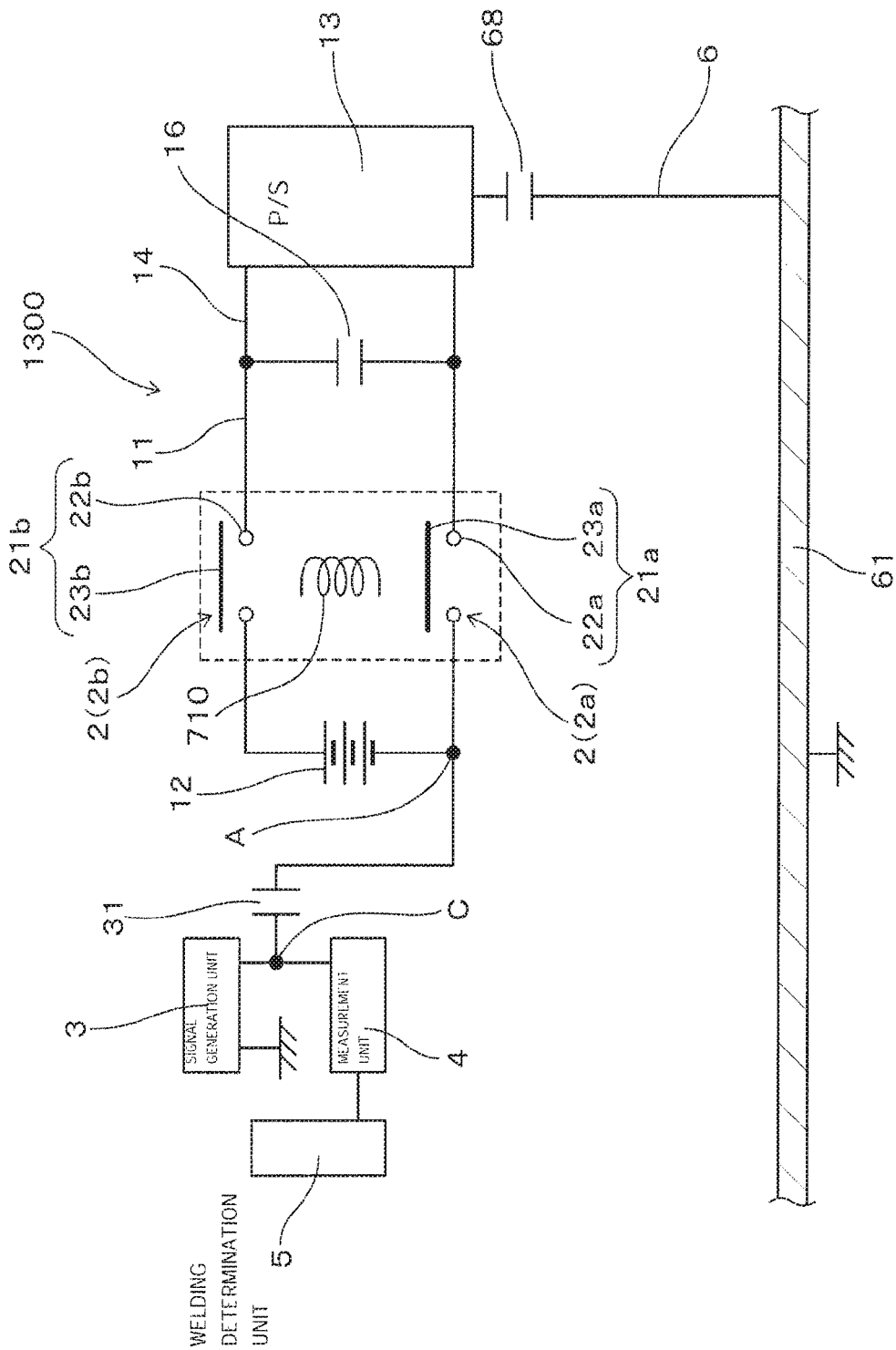
FIG. 31 is a schematic circuit diagram of a contact welding detection system in accordance with a thirteenth embodiment of the present invention.

FIG. 31 shows a contact welding detection system 1300 in accordance with a thirteenth embodiment of the present invention, which is similar in configuration to the contact welding detection system 1200 of the twelfth embodiment except that the first forced ground-contacting unit 6 consists of the capacitor 67.

In FIG. 31, elements having similar functions as in the first and third embodiments are assigned the same numbers, except where specified otherwise.

In the presence of contact welding in at least one of the two main circuit relays 2, the AC signal generated in the signal generation unit 3 will pass to the conductive member 61 through the first forced ground-contacting unit 6, that is, through the capacitor 67. The same advantages as those indicated above for the first embodiment also apply to the present embodiment.

It should be noted that such a configuration is available for the hybrid vehicles and the electrical vehicles as they have a floating capacitance between the power-supply unit 13

(e.g., an inverter or a DC-DC converter) and the conductive member 61 (e.g., a vehicle-body ground). Use of such a floating capacitance allows for testing for the presence or absence of relay contact welding without adding the capacitor 67 as in the twelfth embodiment. In the present embodiment, the floating capacitance can provide the first forced ground-contacting unit 6, which may lead to reduced costs.

In the first to thirteenth embodiments, the first forced ground-contacting unit 6 and the second forced ground-contacting unit 60 are provided with the resistors 63 and 630. Alternatively, these resistors may be removed. Even without such resistors, testing for the presence or absence of contact welding may be conducted.

In the first to thirteenth embodiments, the measurement unit 4 is configured to measure the voltage value at the connection point C along the signal wiring 30. Alternatively, the measurement unit 4 may be configured to measure a current value.

In the first to thirteenth embodiments, the measurement unit 4 is configured to directly measure the electrical characteristic value on the signal wiring 30. Alternatively, the measurement unit 4 may be configured to indirectly measure the electrical characteristic value on the signal wiring 30 via an electronic component such as a resistor or the like. Contact welding detection systems configured such that the electrical characteristic value changes in response to the presence or absence of contact welding in the main circuit relays 2 and others can provide similar advantages as in the first to tenth embodiments.

In the first to thirteenth embodiments, the first forced ground-contacting unit 6 and the second forced ground-contacting unit 60 are provided with the capacitors 65 and 650. Alternatively, these capacitors may be equivalent capacitors having a floating capacitance between the main circuit 1 and the conductive member 61.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A contact welding detection system comprising:
   a main circuit including a direct current (DC) power source, a power-supply unit electrically connected to the DC power source, and at least one main circuit relay electrically connected between the DC power source and the power-supply unit;
   a signal generation unit electrically connected to the main circuit and configured to generate an alternating current (AC) signal;
   a measurement unit configured to measure an electrical characteristic value on a signal wiring between the signal generation unit and the main circuit, the electrical characteristic value being an AC voltage value of the signal wiring between the signal generation unit and the main circuit;
   a welding determination unit configured to determine presence or absence of contact welding in the at least one main circuit relay on the basis of the electrical characteristic value acquired from the measurement unit;
   a first forced ground-contacting unit electrically connected between the main circuit and a conductive member connected to ground, the first forced ground-contacting unit being electrically connected to the main circuit at a connection point that is located on an opposite side of the at least one main circuit relay to a connection point at which the signal generation unit is electrically connected to the main circuit, and the first forced ground-contacting unit including a first welding testing switch for switching on and off a current flowing from the main circuit to the conductive member.

2. The system of claim 1, wherein the first forced ground-contacting unit comprises a resistor electrically connected in series with the first welding testing switch.

3. The system of claim 2, wherein one terminal of the resistor is electrically connected not only to the first welding testing switch, but also to the signal wiring at a connection point that is located between the signal generation unit and the measurement unit through an operation verification switch, whereby when the operation verification switch is in a passing state, the AC signal generated in the signal generation unit can pass to the resistor without passing through the main circuit.

4. The system of claim 1, wherein the at least one main circuit relay comprises a stationary contact part and a movable contact part and is configured such that the movable contact part is movable into and out of contact with the stationary contact part by a magneto-motive force of an electromagnetic coil.

5. The system of claim 1, wherein the at least one main circuit relay comprises:
   a positive relay provided in a positive wiring between a positive terminal of the DC power source and the power-supply unit; and
   a negative relay provided in a negative wiring between a negative terminal of the DC power source and the power-supply unit.

6. The system of claim 5, wherein
   the positive relay and the negative relay comprise their respective contact pairs of a stationary contact part and a movable contact part, and share an electromagnetic coil, and
   the movable contact part of the positive relay and the movable contact part of the negative relay are movable into and out of contact with their respective stationary contact parts by a magneto-motive force of the shared electromagnetic coil.

7. The system of claim 5, further comprising a capacitor, one terminal of the capacitor being electrically connected to the positive wiring between the positive relay and the power-supply unit, and another terminal of the capacitor being electrically connected to the negative wiring between the negative relay and the power-supply unit.

8. The system of claim 1, wherein the connection point at which the signal generation unit is electrically connected to the main circuit is located between the DC power source and the at least one main circuit relay.

9. The system of claim 1, wherein the first forced ground-contacting unit comprises a series connection of the first welding testing switch and a capacitor.

10. The system of claim 1, further comprising:
    a charging circuit including a charger for charging the DC power source, and at least one charging circuit relay electrically connected between the DC power source and the charger; and
    at least one second forced ground-contacting unit electrically connected between the conductive member and the charging circuit, the at least one second forced ground-contacting unit including a second welding testing switch for switching on and off a current flowing from the charging circuit to the conductive member, and the at least one second forced ground-contacting unit being electrically connected to the charging circuit at a connection point that is located on an opposite side of the at least one charging circuit relay to a connection point at which the signal generation unit is electrically connected to the charging circuit.

11. The system of claim 10, wherein the at least one charging circuit relay comprises:
   a positive charging relay disposed in a positive charging line and electrically connected between the positive terminal of the DC power source and the charger; and
   a negative charging relay disposed in a negative charging line and electrically connected between the negative terminal of the DC power source and the charger,
   wherein the at least one second forced ground-contacting unit comprises a negative second forced ground-contacting unit electrically connected between the negative charging line and the conductive member, and a positive second forced ground-contacting unit electrically connected between the positive charging line and the conductive member.

12. The system of claim 11, wherein the negative second forced ground-contacting unit and the positive second forced ground-contacting unit respectively comprise a first series connection of a second welding testing switch and a capacitor and a second series connection of a second welding testing switch and a capacitor.

13. The system of claim 12, wherein
   the negative second forced ground-contacting unit and the positive second forced ground-contacting unit share a second welding testing switch electrically connected to the conductive member, and
   the negative second forced ground-contacting unit and the positive second forced ground-contacting unit comprise their respective capacitors between the shared second welding testing switch and the negative charging line and between the shared second welding testing switch and the positive charging line.

14. The system of claim 13, wherein the first forced ground-contacting unit and the second forced ground-contacting unit share a single testing switch as the first welding testing switch and the second welding testing switch, respectively.

15. The system of claim 10, wherein the at least one charging circuit relay comprises:
   a positive charging relay disposed in a positive charging line and electrically connected between the positive terminal of the DC power source and the charger; and
   a negative charging relay disposed in a negative charging line and electrically connected between the negative terminal of the DC power source and the charger,
   a voltage sensor electrically connected between the positive charging line and the negative charging line and configured to measure a voltage between the positive charging line and the negative charging line, the voltage sensor being electrically connected to the negative charging line at a connection point that is located between the charger and a connection point at which the second forced ground-contacting unit is electrically connected to the negative charging line.

* * * * *